LINE SCANNER

Filed Dec. 28, 1955 12 Sheets-Sheet 1

INVENTORS M. L. ALMQUIST, JR. A. E. JOEL, JR. M. POSIN

BY [signature]

ATTORNEY

INVENTORS M. L. ALMQUIST, JR.
A. E. JOEL, JR.
M. POSIN
BY [signature]
ATTORNEY

LINE SCANNER

Filed Dec. 28, 1955 12 Sheets-Sheet 3

INVENTORS M. L. ALMQUIST, JR.
A. E. JOEL, JR.
M. POSIN
BY [signature]
ATTORNEY

LINE SCANNER

Filed Dec. 28, 1955

INVENTORS M. L. ALMQUIST, JR.
A. E. JOEL, JR.
M. POSIN
BY [signature]
ATTORNEY

Sept. 23, 1958 M. L. ALMQUIST, JR., ET AL 2,853,553

LINE SCANNER

Filed Dec. 28, 1955 12 Sheets-Sheet 5

INVENTORS M. L. ALMQUIST, JR.
A. E. JOEL, JR.
M. POSIN

BY [signature]

ATTORNEY

LINE SCANNER

Filed Dec. 28, 1955 12 Sheets-Sheet 6

INVENTORS M. L. ALMQUIST, JR.
A. E. JOEL, JR.
M. POSIN
BY [signature]
ATTORNEY

LINE SCANNER

INVENTORS M. L. ALMQUIST, JR.
A. E. JOEL, JR.
M. POSIN

BY

ATTORNEY

INVENTORS M. L. ALMQUIST, JR.
A. E. JOEL, JR.
M. POSIN
BY [signature]
ATTORNEY

INVENTORS M. L. ALMQUIST, JR.
A. E. JOEL, JR.
M. POSIN

BY [signature]

ATTORNEY

LINE SCANNER

Filed Dec. 28, 1955

INVENTORS M. L. ALMQUIST, JR.
A. E. JOEL, JR.
M. POSIN

BY [signature]

ATTORNEY

INVENTORS M. L. ALMQUIST, JR.
A. E. JOEL, JR.
M. POSIN
BY [signature]
ATTORNEY

INVENTORS M. L. ALMQUIST, JR.
A. E. JOEL, JR.
M. POSIN
BY [signature]
ATTORNEY

United States Patent Office 2,853,553

Patented Sept. 23, 1958

2,853,553

LINE SCANNER

Milton L. Almquist, Jr., Maplewood, and Amos E. Joel, Jr., South Orange, N. J., and Melvin Posin, New York, N. Y., assignors to Bell Telephone Laboratories, Incorporated, New York, N. Y., a corporation of New York Application December 28, 1955, Serial No. 555,916

21 Claims. (Cl. 179—18)

This invention relates to a line scanning system for signaling the service condition of a number of subscriber lines connected by a remote line concentrator to a central office.

In the Joel-Krom-Posin Patent 2,812,385 issued on November 5, 1957, there is disclosed a concentrator telephone system which includes remotely located line concentrators for providing connections between a large number of subscriber lines and a small number of talking trunks. The trunks connect the line concentrators with the central office. The line concentrator system effects considerable saving in the cost of operation of the telephone plant by avoiding the necessity of providing a separate direct connection from the central office to each subscriber line. As the central office is not directly in information communication with the subscriber lines due to the interposition of the remote line concentrator, provision is necessary for informing the central office of the service condition of each of the subscriber lines as needed. The line service conditions to be determined are essentially the idle condition, in which there is no connection through a line concentrator to the central office, the busy condition, in which there is such a connection, and the service request condition, in which the subscriber line is in a calling condition but not connected through the line concentrator to the central office.

In non-concentrator telephone systems the subscriber lines terminate directly in the central office and contacts on the line and cut-off relays are utilized to determine which of the line conditions exist. It is an object of this invention to eliminate such line and cut-off relays by signaling an indication of the service condition of each of the subscriber lines connected to the remote concentrator over a common signaling path to the central office.

More specifically it is an object of this invention to provide, in a telephone system, an improved electrical signaling circuit for generating indications of the idle, busy and service request conditions of a plurality of subscriber lines located at a point remote from a central office.

In one specific illustrative embodiment of the invention, a scanner pulse generator in the central office supplies a series of readying pulses and a series of scanning pulses over control paths connecting the line concentrator with the central office. The readying pulses successively condition groups of scanning units located at the concentrator. The scanning units are individually associated with the subscriber lines connected to the line concentrator. Each scanning unit includes two gating circuits, one of which is enabled or conditioned by the readying pulse from the central office and the other of which is controlled by the condition of the line associated with the respective scanning unit. The scanning pulses are applied successively to groups of scanning units, each of which includes one unit in a readied group of units. During a complete scanning cycle the total number of scanning pulses is equal to the number of subscriber lines. The scanning pulses pass through the enabled first gating circuit in the readied scanning unit, to the second gating circuit therein. If a subscriber line is in a service request condition, the second gating circuit associated therewith is enabled and the scanning pulse corresponding thereto passes therethrough, and through one of the control paths to the central office. If a subscriber line is busy, the second gate circuit is not enabled but a path is provided for the scanning pulse through an operated cross-point which provides for a connection between the busy line and one of the trunks connecting the line concentrator to the central office. The scanning pulse which is passed through the operated crosspoint is supplied as a line busy indication over one of the control paths to the central office.

In this manner, depending upon the condition of a subscriber line, the scanning pulse corresponding thereto is either blocked or sent to the central office as a service request or line busy indication. A feature of the present invention pertains to means which functions to steer the scanning pulses in accordance with the condition of the line.

Another feature of the present invention relates to scanning means for sequentially indicating the service condition of each of the subscriber lines and, upon the initiation of a service request indication, for increasing the scanning rate of the line scanner. The increased rate is accomplished by partially stopping the pulse transmission and scanning only within the indicated group. The service request pulse from the line concentrator stops the scanner pulse generator from transmitting the series of readying pulses to the concentrator but allows it to continue transmitting the series of scanning pulses. The same group of scanning units at the concentrator remain readied and the series of scanning pulses are steered therethrough to repeatedly scan the subscriber lines associated therewith.

Still another feature of the present invention pertains to checking means for determining whether the service request indication was an accident or the call abandoned. By scanning within the indicated group each series of scanning pulses provides an additional service request pulse to the central office to successively ready switching circuits therein. A number of service request pulses to the central office are necessary to accomplish the complete switching function thereat.

Further objects and features will become apparent from the following description and accompanying drawings wherein:

Figs. 1 through 11, when arranged in accordance with Fig. 12, are a circuit representation of the line concentrator scanning system of the present invention wherein;

Figures 1, 12:
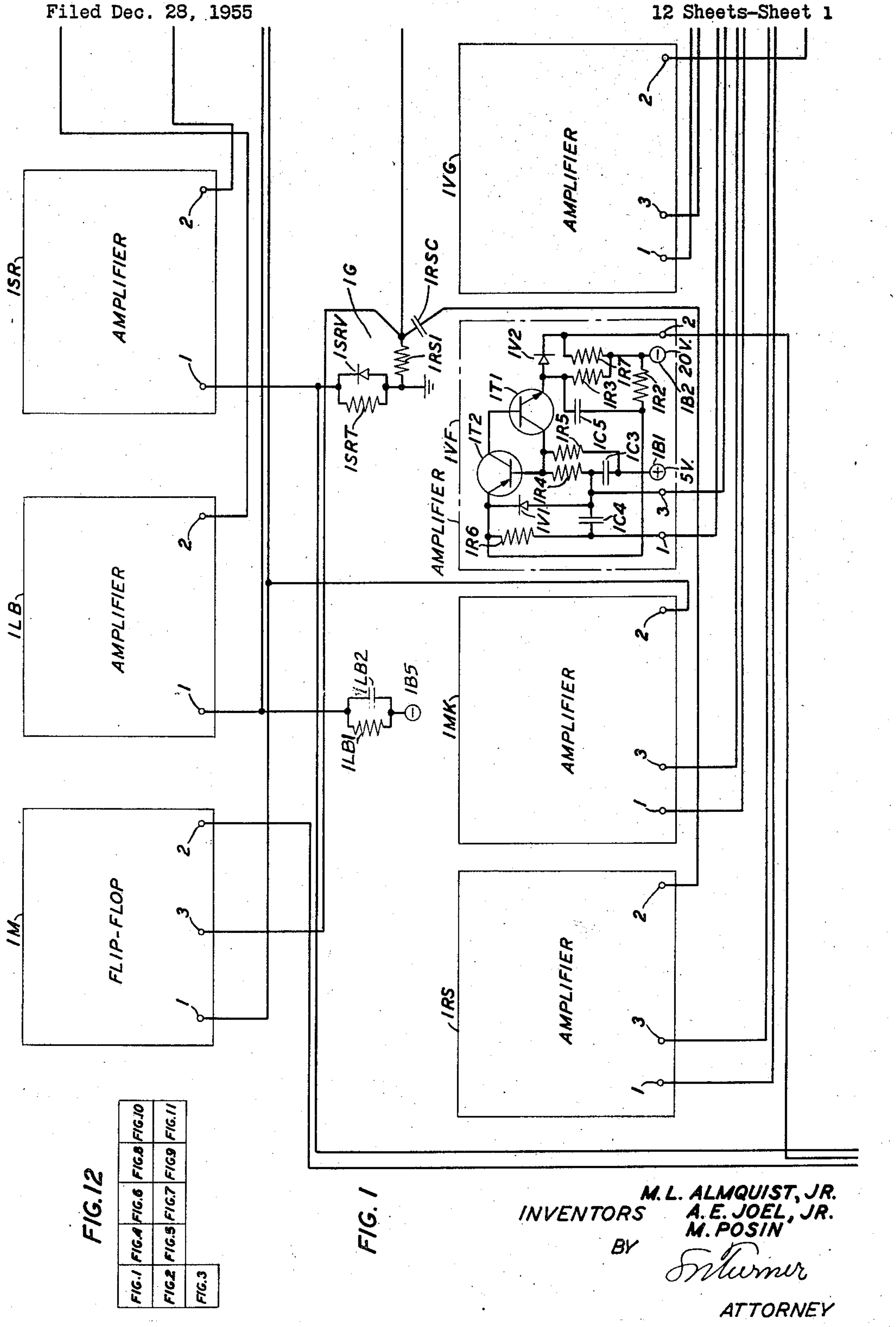
Fig. 1 illustrates a plurality of line concentrator amplifiers.
Fig. 12 illustrates the arrangement of Figs. 1 through 11.
Figure 2:
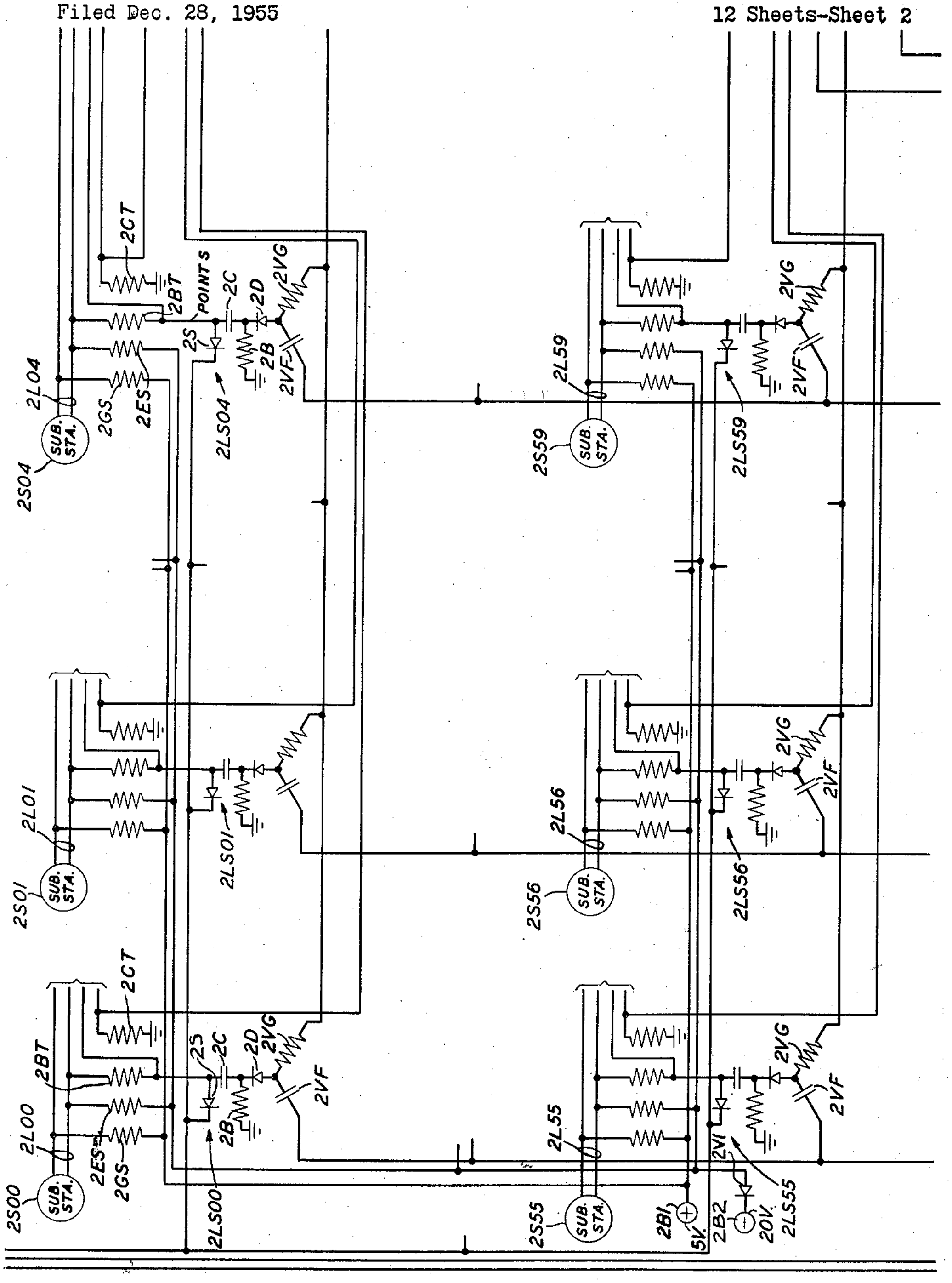
Fig. 2 illustrates a plurality of subscriber lines and line concentrator scanning units.

In the drawing, the relay contacts are shown detached from the relay windings. The first digit of each reference number indicates the figure in which it appears and the letters indicate the function thereof. Relay 3F0, for example, is the vertical file relay 0 and appears in Fig. 3. The designation of the contact of a relay includes in parenthesis the relay reference number with the first digit before the parenthesis indicating the figure in which the contact appears. Contact 5(3F0), for example, appears in Fig. 5 and is a contact of the vertical file relay 0 which appears in Fig. 3. Contacts which are closed when the relay is operated are represented by an X crossing lines representing the connecting conductors.

Referring to Figs. 1 through 11, when arranged in accordance with Fig. 12, the line concentrator shown in Figs. 1 through 5 is located at a remote location from the central office shown in Figs. 6 through 11 and has connected thereto 60 subscriber stations 2S00–59 by the subscriber lines 2L00–59. One effect of utilizing line concentrators is, as described in the above-identified disclosure of Joel-Krom-Posin, to place a part of the switching equipment of the central office at a distance therefrom to conserve outside plant facilities. The line concentrator is connected to the central office by a plurality of trunks only one of which, trunk 4T, is shown, and by three control pairs 4CP0–2. The trunks 4T provide a talking path between the line concentrator and the central office and the three control pairs 4CP0–2 provide for signaling paths to and from the central office control equipment.

With all the subscriber lines 2L00–59 idle the central office continuously scans the 60 subscriber lines 2L00–59 which are connected to the line concentrator. The central office provides to the concentrator twelve 15-volt vertical group pulses spaced at intervals of 10 milliseconds and five 15-volt vertical file pulses spaced at intervals of 2 milliseconds between each pair of vertical group pulses. The vertical file and vertical group pulses are half millisecond pulses and the complete cycle has a duration of 120 milliseconds. Scanning pulses for the line concentrator are provided from a scanner pulse source or generator 7PS which is described in the above-identified disclosure by Joel-Krom-Posin. The pulse source 7PS includes a kilocycle oscillator, not shown, which generates the various pulses. In addition to the vertical group and vertical file pulses, as shown in the pulse sequence diagram depicted in Fig. 13, the source 7PS supplies one reset pulse at the beginning of the cycle to insure the synchronous operation of the line concentrator scanning cycle with the pulse source 7PS. The reset pulse also functions as the first vertical pulse so that only 59 vertical pulses are provided instead of 60. During one scanning cycle, the pulse source 7PS therefore supplies one reset pulse, twelve vertical group pulses and 59 vertical file pulses; one vertical file pulse, if the reset pulse is included, for each of the subscriber lines 2L00–59 connected to the line concentrator.

The pulse source 7PS supplies pulses from terminals 1 through 7 as follows:

(1) terminal 1 is for the serially arranged vertical file pulses;

(2) terminal 2 is for the serially arranged vertical group pulses;

(3) terminal 3 is for the reset pulses;

(4) terminal 4 is for mark pulses which are hereinafter described;

(5) terminal 5 is connected through the control lead 8L5 to the switching circuit 800 which is also hereinafter described;

(6) terminal 6 indicates five terminals for individually and cyclically providing vertical file pulses; and (7) terminal 7 is for timing pulses each of which occurs in time between two vertical file pulses. There are sixty timing pulses in a 120-millisecond cycle.

The vertical group pulses are in phase with the timing pulses, and the reset pulses are in phase with the vertical file pulses.

Figure 3:
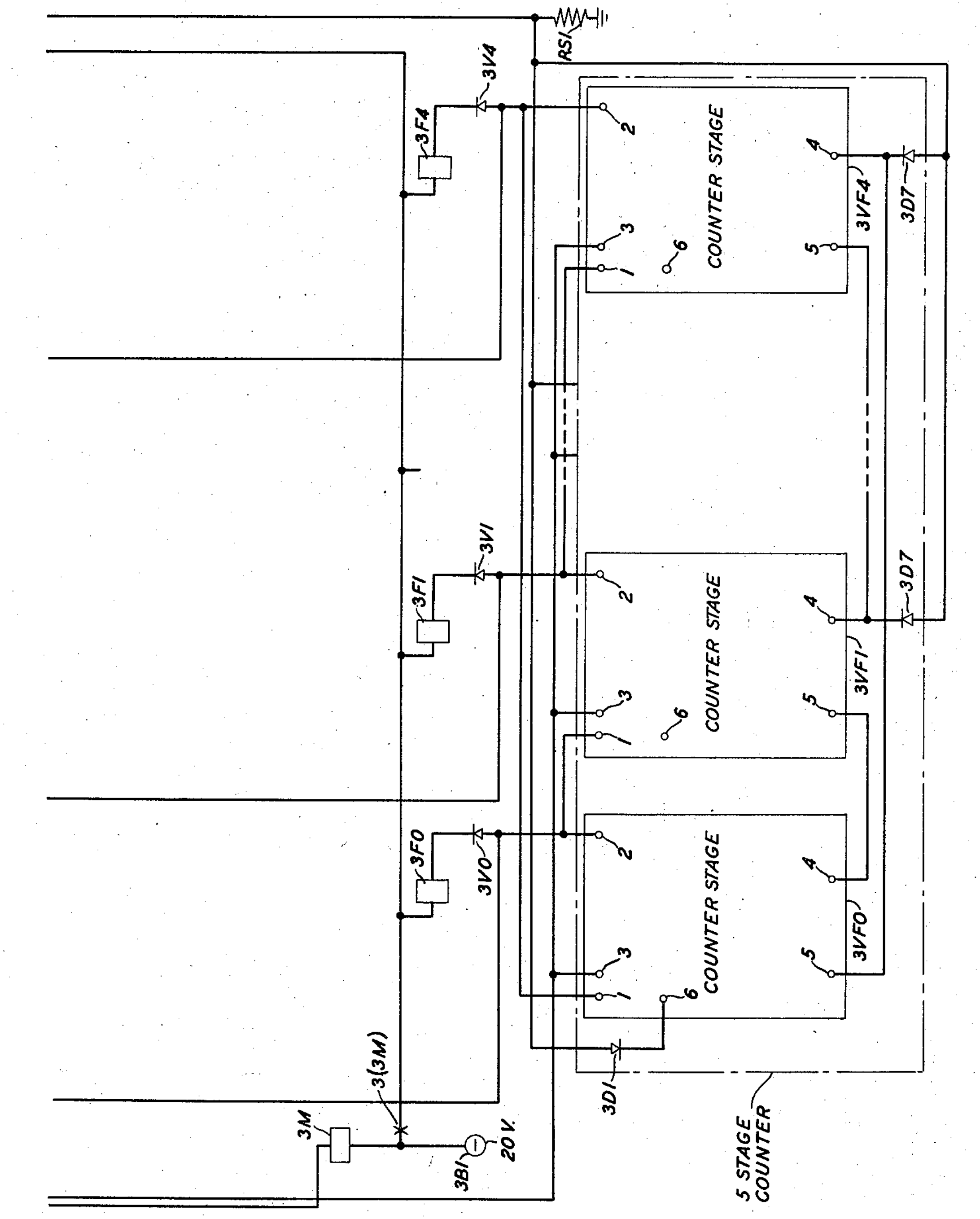
Figs. 3 and 5 illustrate the line concentrator ring counter circuit.
Figure 5:
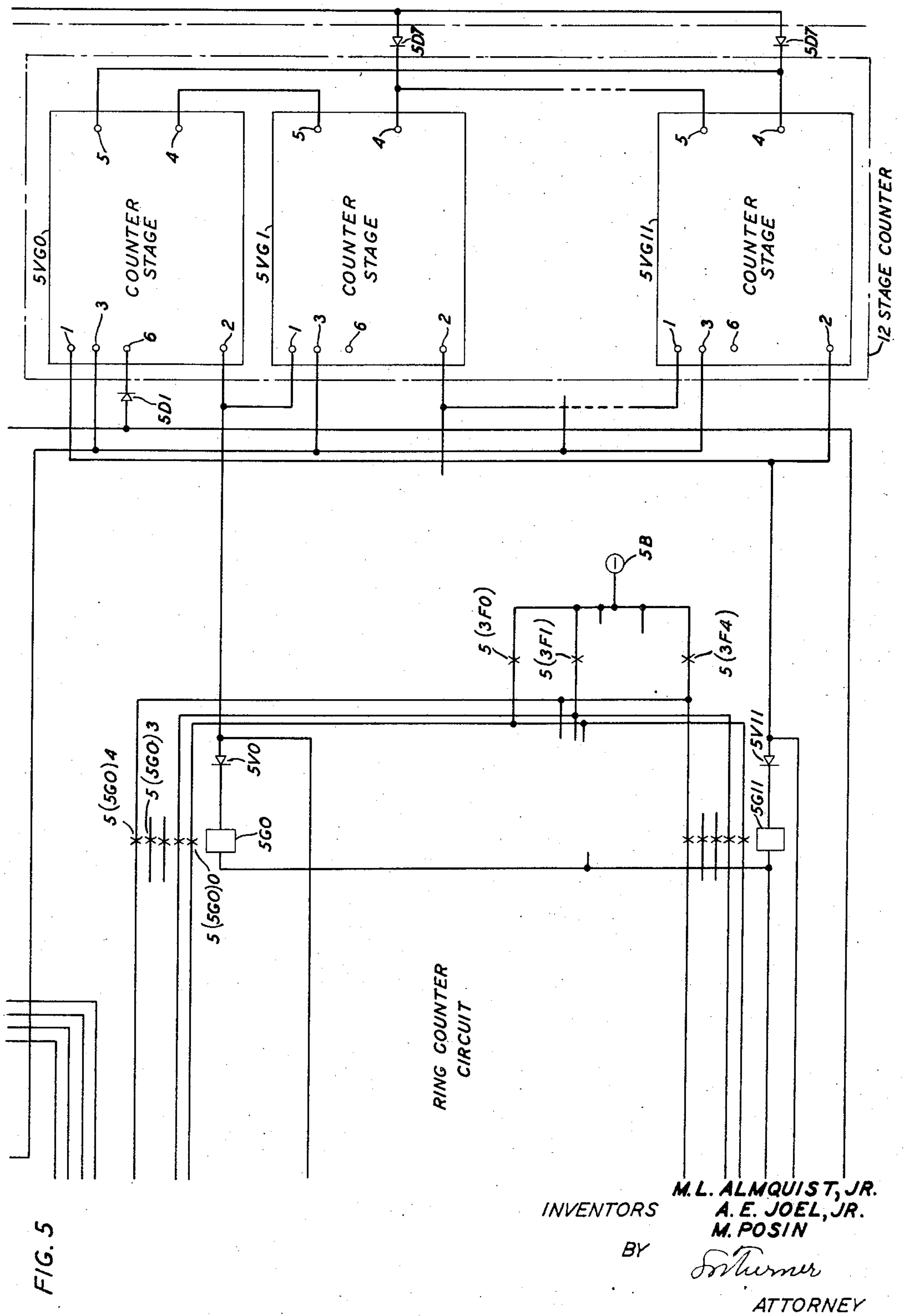
Figure 6:
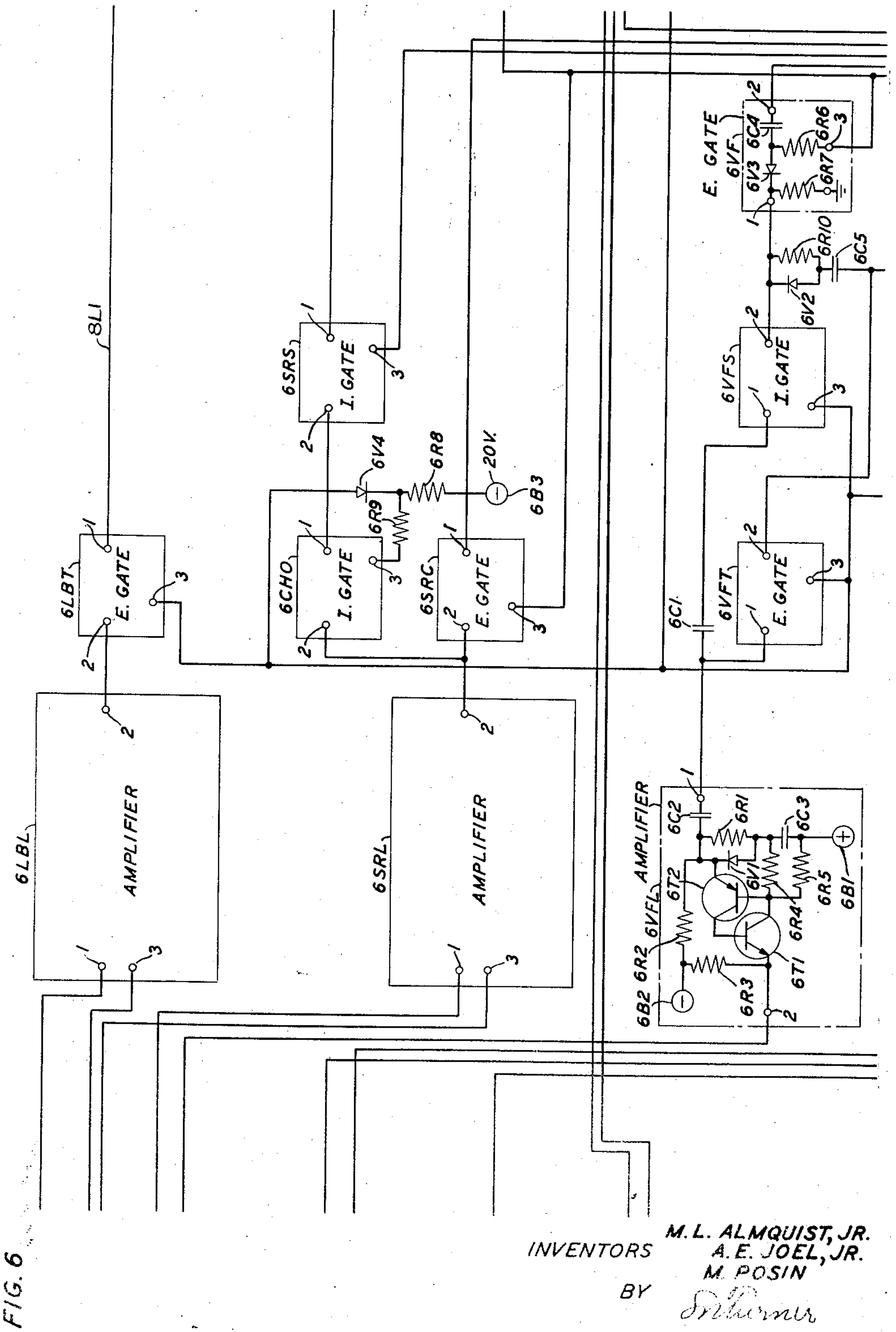
Figs. 6, 7 and 9 illustrate various circuit components in the scanning control circuit at the central office.
Figure 7:
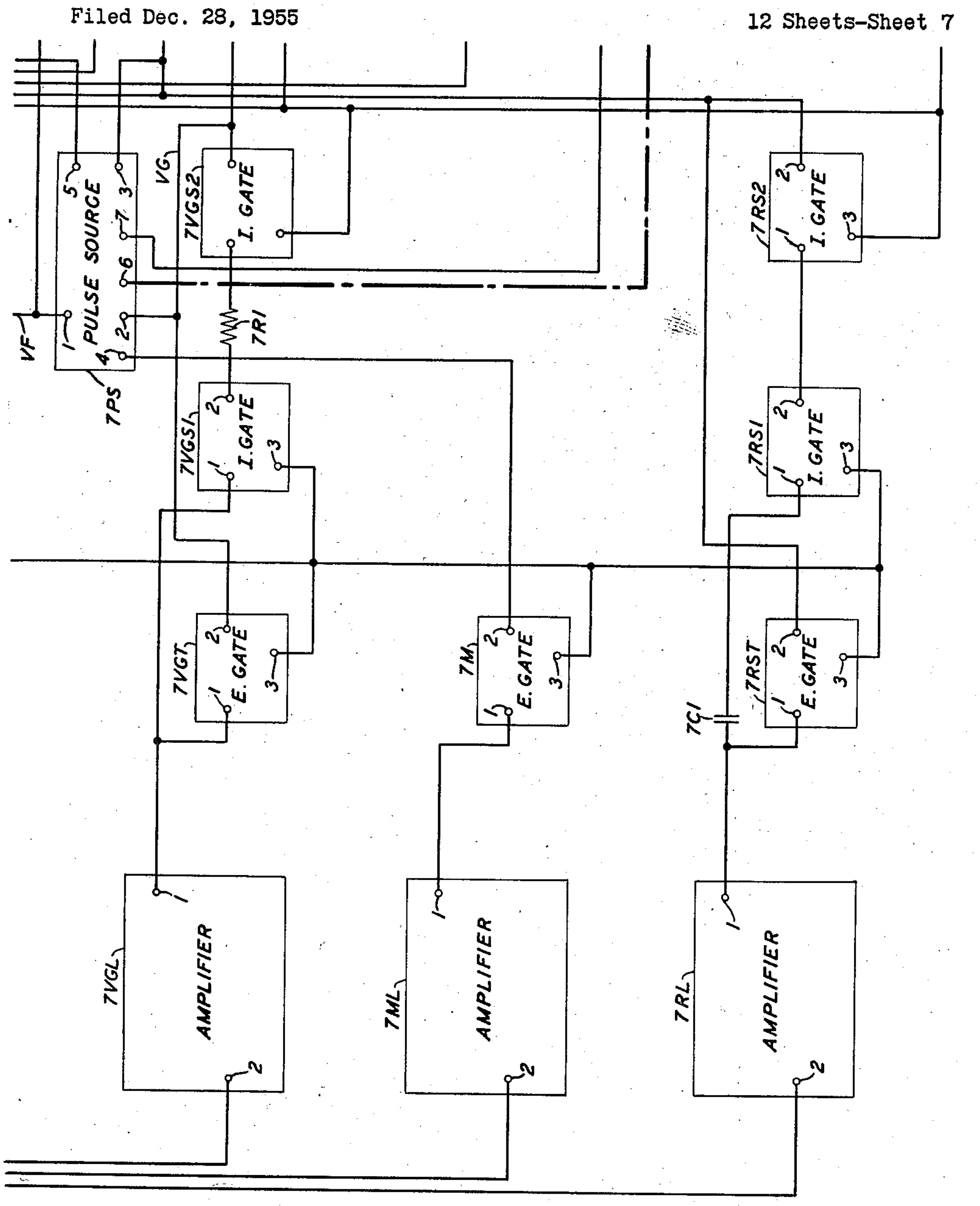
Figure 8:
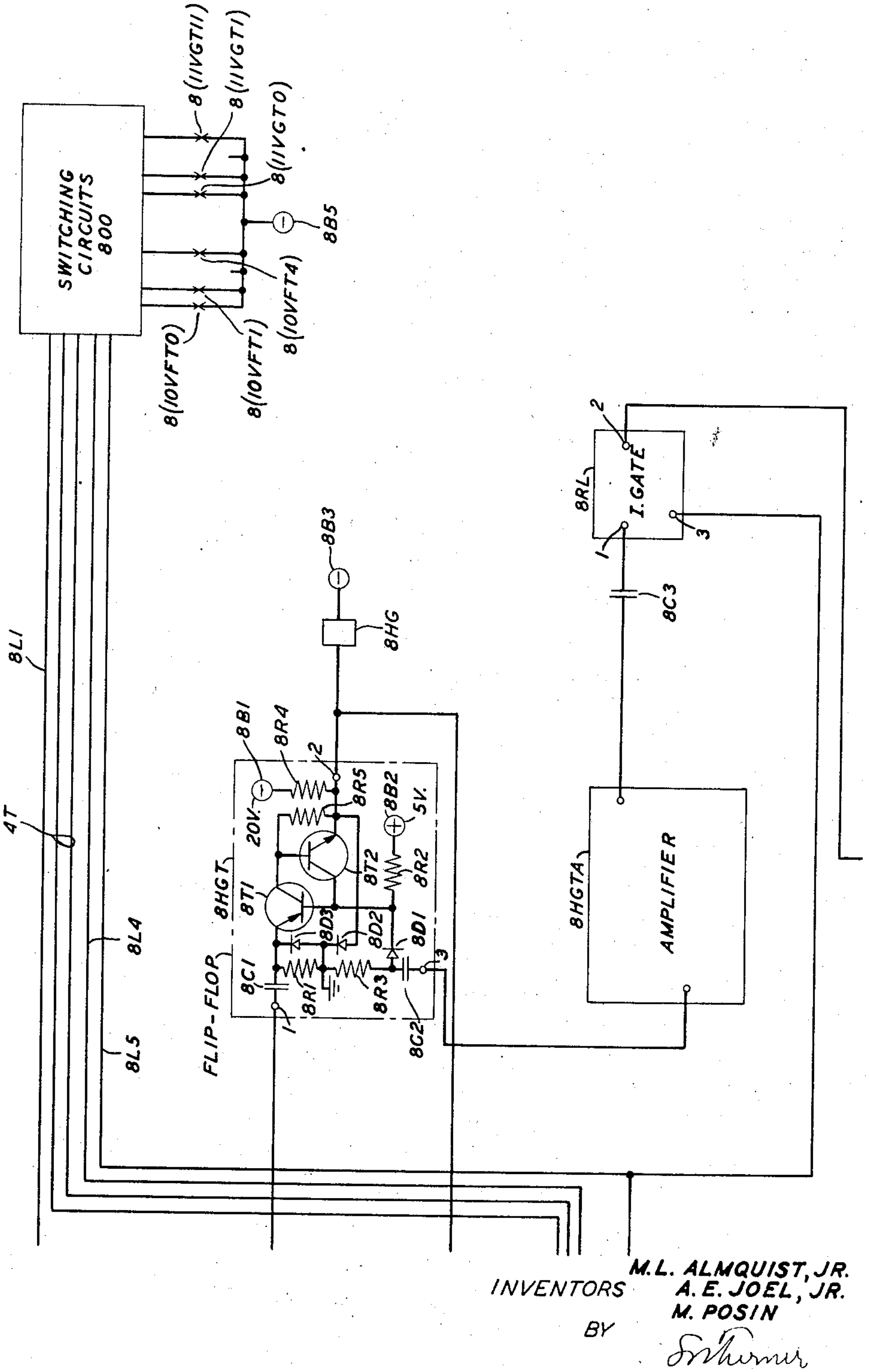
Fig. 8 illustrates diagrammatically the central office trunk switching system.
Figure 9:
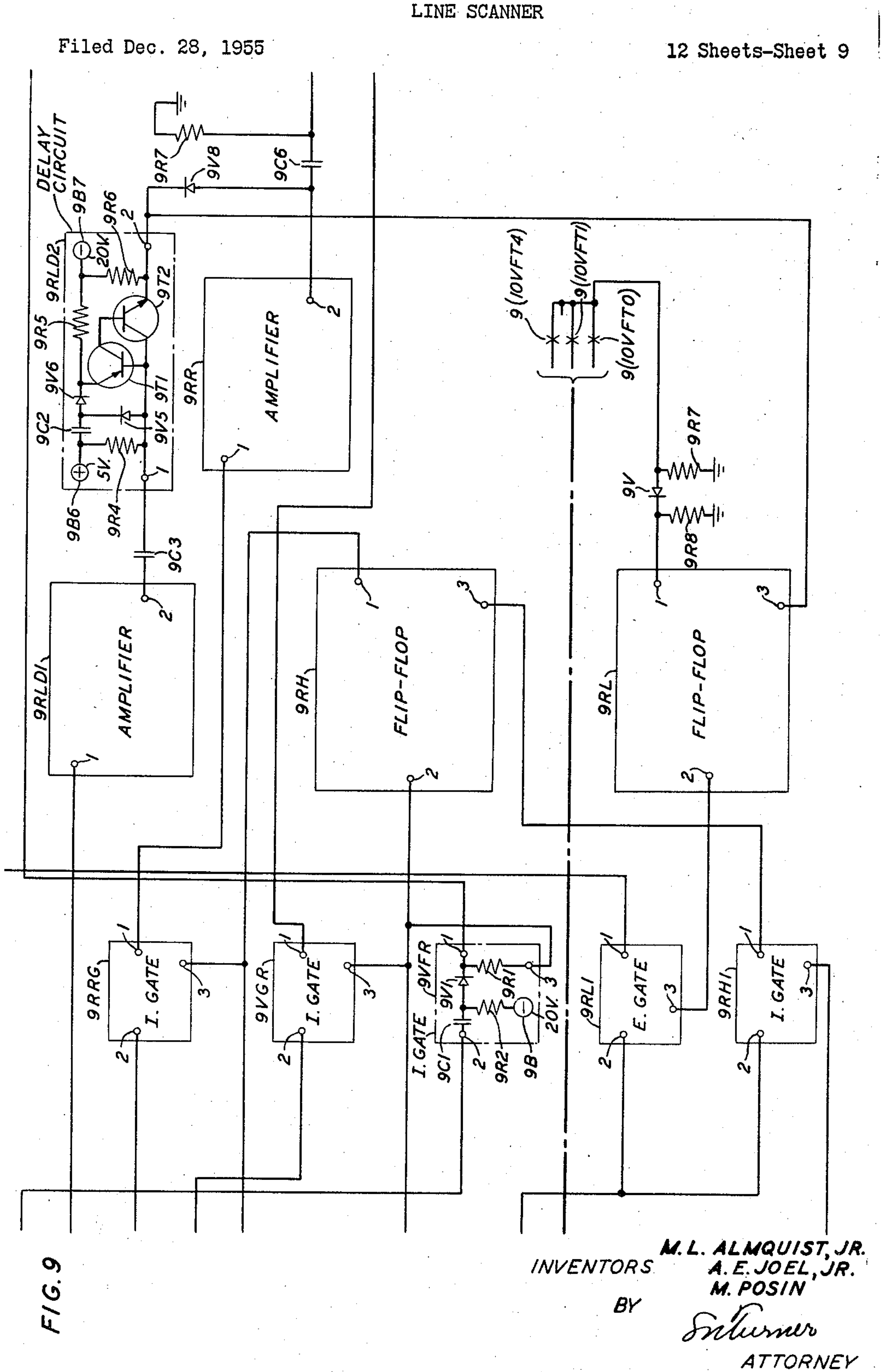
Figure 10:
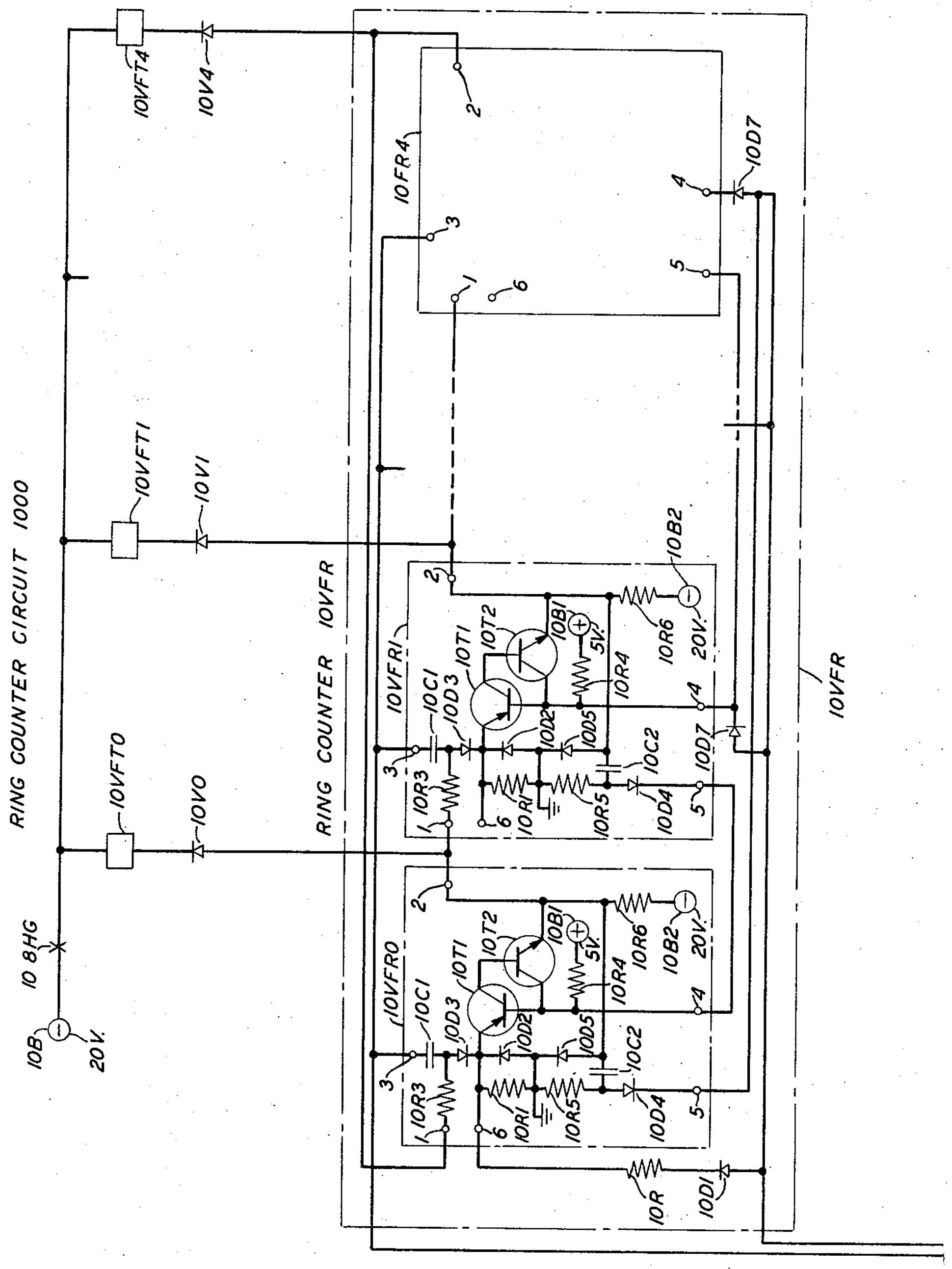
Figs. 10 and 11 illustrate the ring counter register circuit at the central office.
Figure 11:
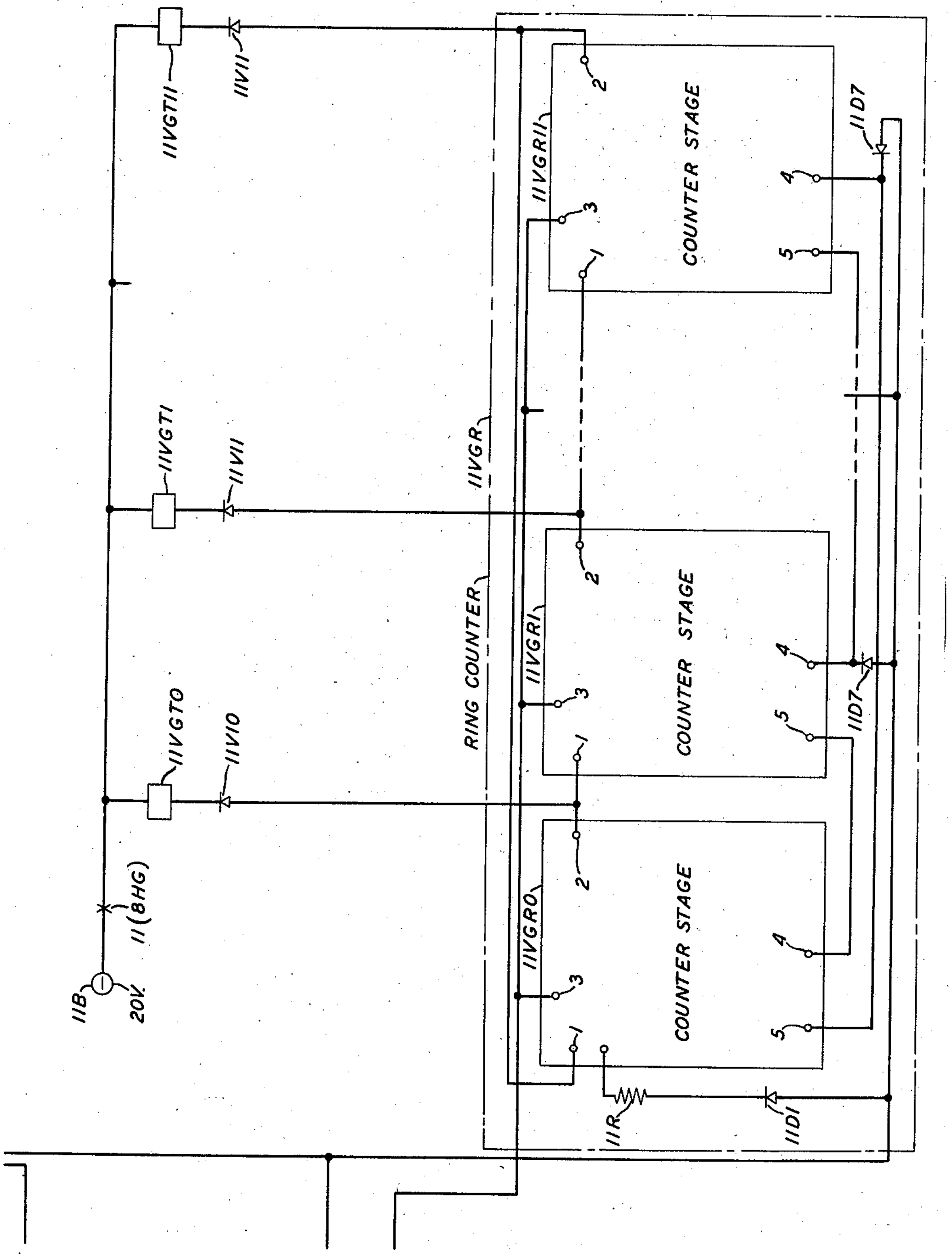

The pulse source 7PS supplies the reset, vertical file and vertical group pulses to two synchronously operated ring counter circuits; one in the line concentrator and the other in the central office. The central office ring counter circuit 1000, which functions, as is hereinafter described, to register the identity of a calling subscriber, is shown in Figs. 10 and 11 and the line concentrator ring counter circuit 500 is shown in Figs. 3 and 5. The circuits 1000 and 500 are similar and include, respectively, the vertical group ring counters 11VGR and 5VG and the vertical file ring counters 10VFR and 3VF.

The source 7PS suppies vertical file pulses to the counter 10VFR from terminal 1 through the inhibiting gate 9VFR and vertical group pulses to the counter 11VGR from terminal 2 through the inhibiting gate 9VGR. The gates 9VFR and 9VGR are similar with each having three terminals designated 1–3. The terminal 1 is the output terminal, the terminal 2 is the input pulse terminal and the terminal 3 is the control input terminal. With —20 volts at its control terminal 3, the gate 9VFR functions to allow passage of pulses from the input terminal 2 through to the output terminal 1. The —20 volt potential at terminal 3 forward-biases the varistor 9V1 which is connected thereto through the resistor 9R1. The varistor 9V1 is connected to the terminal 1 and through the capacitor 9C1 to terminal 2 and the junction between capacitor 9C1 and varistor 9V1 is connected through the resistor 9R2 to the —20 volt battery 9B. The presence of a positive 15-volt pulse from the source 7PS causes the potential at the junction between the capacitor 9C1 and the varistor 9V1 to increase to —5 volts which is 15 volts positive with respect to the potential at terminal 1. The forward-biased varistor 9V1 allows the pulse therethrough to appear across the load resistor 9R1. In its inhibiting state the terminal 3 is at a potential of —2 volts and the varistor 9V1 is reversed-biased with a potential of approximately 18 volts. The presence of a positive 15-volt pulse across the input resistor 9R2 is insufficient to overcome the reverse biasing of varistor 9V1 so that an output pulse does not appear across the resistor 9R1. Terminal 3 of the gate 9VFR, as well as of the gate 9VGR, is connected to the flip-flop circuit 9RH which provides the —20 volt normal potential and the —2 volt inhibiting potential, as is hereinafter described.

The pulses from the pulse source 7PS are supplied in this manner through the gates 9VFR and 9VGR, respectively, to the counters 10VFR and 11VGR in circuit 1000, with five pulses being supplied to the counter 10VFR for each pulse being supplied to the counter 11VGR.

The counter 10VFR is a five-stage ring counter having stages 10VFR0–4 and the counter 11VGR is a twelve-stage ring counter having stages 11VGR0–11. A ring counter may be referred to as a walking circuit or a sequence circuit which advances one step for each input pulse supplied thereto. The vertical file pulses from the pulse source 7PS through gate 9VFR are supplied to the input terminal 3 of each of the five stages 10VFR0–4. A single counter stage, such as the stage 10VFR0, may be thought of as a combination of an enabling gate and flip-flop circuit. A stage is said to be gated when its gate is enabled and is said to be "on" when its flip-flop circuit is set. A stage may be turned on only if its gate is enabled to allow the input pulse therethrough to set or turn on its flip-flop circuit. When a stage is turned on the potential at its output terminal 2 changes from —20 volts to —2 volts to enable the gate of the succeeding stage. Assume for example that at the beginning of the scanning cycle the stage 10VFR0 has its flip-flop circuit set. Only one of the stages 10VFR0–4 is set at a time and the stage succeeding the set stage is the only gated or enabled stage. The input terminal 3 through which the positive pulse is supplied is connected through the input coupling capacitor 10C1 and the varistor 10D3 to the emitter electrode of the transistor 10T1. The transistor 10T1 is one of two transistors 10T1 and 10T2 which are connected in a hook circuit of the type described in the Patent 2,655,609 which issued to W. Shockley on October 13, 1953. The emitter electrode of transistor 10T1 is connected to ground through the resistor 10R1 and through the varistor 10D2. The resistor 10R1 functions as a load resistor for the input pulse and the varistor 10D2 provides a low resistance path for the emitter sustaining current and also functions to dissipate any negative pulses to ground. The base of transistor 10T1 is connected to the collector of transistor 10T2, to the +5 volt direct-current potential source 10B1 through the base resistor 10R4, and through the reset terminal 4 to the terminal 5 of the succeeding stage 10VFR1. The emitter electrode of transistor 10T2 is connected to the output terminal 2 and to the —20 volt battery 10B2 through resistor 10R6.

With the first stage 10VFR0 on, the output terminal 2 thereof is at a potential of —2 volts due to the current through the resistor 10R6. With the —2 volt potential at terminal 2 of stage 10VFR0 the varistor 10D3 of stage 10VFR1 is forward-biased. The terminal 2 of stage 10VFR0 is connected through the terminal 1 of stage 10VFR1 and resistor 10R3 to the varistor 10D3. With the varistor 10D3 in stage 10VFR1 forward-biased the stage 10VFR1 is enabled so that an input pulse through terminal 3 thereof causes it to turn on. If stage 10VFR0 is not on and its terminal 2 is at a potential of —20 volts, varistor 10D3 in stage 10VFR1 is reversed-biased so that an input pulse through its terminal 3 does not turn it on.

When the first pulse is supplied to the terminals 3 of stages 10VFR0–4 from the source 7PS, it turns on the stage 10VFR1 through the enabled gate circuit which includes the forward-biased varistor 10D3. The potential at terminal 2 of stage 10VFR1 changes from —20 volts to —2 volts to enable the stage 10VFR2 and reset the stage 10VFR0. The terminal 2 in stage 10VFR1 is connected through the capacitor 10C2 of stage 10VFR1, varistor 10D4 and terminal 5 to terminal 4 of stage 10VFR0. Terminal 4 is connected, as described above, to the base electrode of transistor 10T1. When terminal 2 of stage 10VFR1 changes in potential from —20 volts to —2 volts, the change in potential is provided to the base of transistor 10T1 in stage 10VFR0 causing the stage 10VFR0 to turn off. When the stage 10VFR0 is turned off, in this manner, the potential at its terminal 2 decreases from —2 volts to —20 volts disabling the gate circuit including the varistor 10D3 in the stage 10VFR1.

To briefly recapitulate, the first pulse supplied to terminals 3 of stages 10VFR0–4 turns on the stage 10VFR1 which enables the stage 10VFR2 and resets or turns off the stage 10VFR0. When the stage 10VFR0 is turned off it disables the stage 10VFR1. After the first pulse, therefore, the stage 10VFR1 is turned on and the others are turned off and the stage 10VFR2 is enabled and the others all disabled.

The second positive pulse from source 7PS turns on the stage 10VFR2 which enables the stage 10VFR3 and turns off the stage 10VFR1 which in turn disables the stage 10VFR2. The pulses supplied to the terminals 3 of the stages 10VFR0–4 in this manner advance the setting from stage to stage with the sixth pulse being equivalent to pulse No. 1. The sixth pulse is equivalent to the first pulse because the stages 10VFR0–4 are connected in a ring with the output terminal 2 of stage 10VFR4 being connected to terminal 1 of stage 10VFR0 and the terminal 5 of stage 10VFR4 being connected to the reset terminal 4 of stage 10VFR0. The above sequence continues from stage to stage in the counter 10VFR until the input pulses are removed. A similar sequence of events takes place in the counter 10VGR except that it takes twelve pulses to complete a cycle instead of five.

At the beginning of each cycle a positive reset pulse is supplied from terminal 3 of the pulse source 7PS through the inhibiting gate 9RRG, the amplifier 9RR and capacitor 9C6 to the register counter circuit 1000. The gate 9RRG, as well as all the inhibiting gates hereinafter referred to, is similar to the gate 9VFR described above, and the reset amplifier 9RR is similar to the amplifier 6VFL which is hereinafter described in detail. The capacitor 9C6 is connected to ground through the resistor 9R7 and through the reverse-biased varistor 9V8 to the hereinafter described circuit 9RLD2. The reset pulse through the amplifier 9RR is supplied, respectively, through the serially connected varistor 10D1 and resistor 10R to the terminal 1 of stage 10VFR0, and through the serially connected varistor 11D1 and resistor 11R to the terminal 1 of the stage 11VGR0 to turn these stages on. The reset pulse is also supplied through the varistors 10D7 and 11D7 to the reset terminals 4 of the other stages in the counters 10VFR and 11VGR to reset or turn off these stages. At the beginning of each cycle, therefore, the pulse source 7PS supplies a reset pulse to the counters 10VFR and 11VGR to return them to normal. The source 7PS does not supply a vertical file pulse when the reset pulse is supplied. The reset pulse functions as the first vertical file pulse since it is supplied to the input terminals 1 of stages 10VFR0 and 11VGR0. The source 7PS therefore supplies twelve vertical group pulses, one reset pulse and 59, not 60, vertical file pulses.

The pulse source 7PS supplies the vertical file and vertical group pulses to the counters 10VFR and 11VGR as described above, and also through the control leads 4CP1 and 4CP2 to the concentrator. The pulse source 7PS is connected through the capacitor 6C5 and the varistor 6V2, shunted by the resistor 6R10, to the terminal 2 of the inhibiting gate 6VFS which is similar, as described above, to the gate 9VFR. With the inhibiting gate 6VFS open the vertical file pulses from the pulse source 7PS are supplied through the capacitor 6C1 and amplifier 6VFL to the transformer 4T1.

The amplifier 6VFL, which is a transistor pulse amplifier having transistors 6T1 and 6T2 connected in a hook arrangement, functions to transform the pulses supplied from the source 7PS into square wave pulses of 15-volt amplitude and 500-microsecond duration. The illustrative embodiment of the present invention includes two types of amplifiers; a single input 500-microsecond pulse transmitting amplifier and a double input 100-microsecond receiving amplifier. When a pulse is being amplified to be transmitted through the control leads 3C0–2 a transmitting amplifier is utilized. The amplifier 6VFL is a transmitting amplifier which is utilized to amplify the vertical file pulses sent to the concentrator through the control lead 4CP1. The pulse amplifier 6VFL is monostable and does not have to be reset after being triggered by an input pulse but returns to its original quiescent condition due to the internal circuit action. This is due to the fact that the potential on the emitter of transistor 6T2 returns to a predetermined negative biasing potential with respect to the base due to a biasing path from battery 6B1 through resistors 6R5 and 6R4, varistor 6V1, shunted by resistor 6R1, and the resistor 6R2 to battery 6B2. In its normal state the emitter electrode of transistor 6T2 is at a potential of 3.2 volts while the base thereof is at a potential of 4.42 volts. Thus an input pulse which is just over 1.2 volts through terminal 1 and capacitor 6C2 from the pulse source 7PS causes the amplifier 6VFL to trigger. The capacitor 6C3 which is connected between resistors 6R4 and 6R5 controls the duration of the output pulse supplied from the emitter of transistor 6T1 through terminal 2 of the amplifier 6VFL. The input pulse through terminal 1 triggers the amplifier 6VFL providing a charging path from the battery 6B1 on one side of capacitor 6C3 and through varistor 6V1 and transistors 6T2 and 6T1 and resistor 6R3 to battery 6B2 on the other side of capacitor 6C3. After the capacitor 6C3 has charged it offers a high impedance path to the +5 volt battery 6B1 allowing the biasing path described above to function as the capacitor 6C3 discharges to return the amplifier 6VFL to normal.

The output pulse of amplifier 6VFL is connected from the output terminal 2 thereof through the resistor 4R4 to the upper primary of transformer 4T1. The serially connected resistor 4R4 and upper primary of transformer 4T1 are shunted by the varistor 4V1 which is connected to battery 4B1. The positive 15-volt pulse from amplifier 6VFL is supplied through the transformer 4T1 and the control leads 4CP1 to the line concentrator.

In a similar manner the pulse source 7PS supplies the vertical group pulses to the counter 11VGR, as described above, and through the inhibiting gate 7VGS2, resistor 7R1, the inhibiting gate 7VGS1, amplifier 7VGL, transformer 4T2 and control leads 4CP2 to the line concentrator. The path from amplifier 7VGL, which is similar to the amplifier 6VFL, is through resistor 4R6, and the upper primary of transformer 4T2 to battery 4B2. The resistor 4R6 and the upper primary of transformer 4T2 are shunted by the varistor 4V5.

Figure 13:
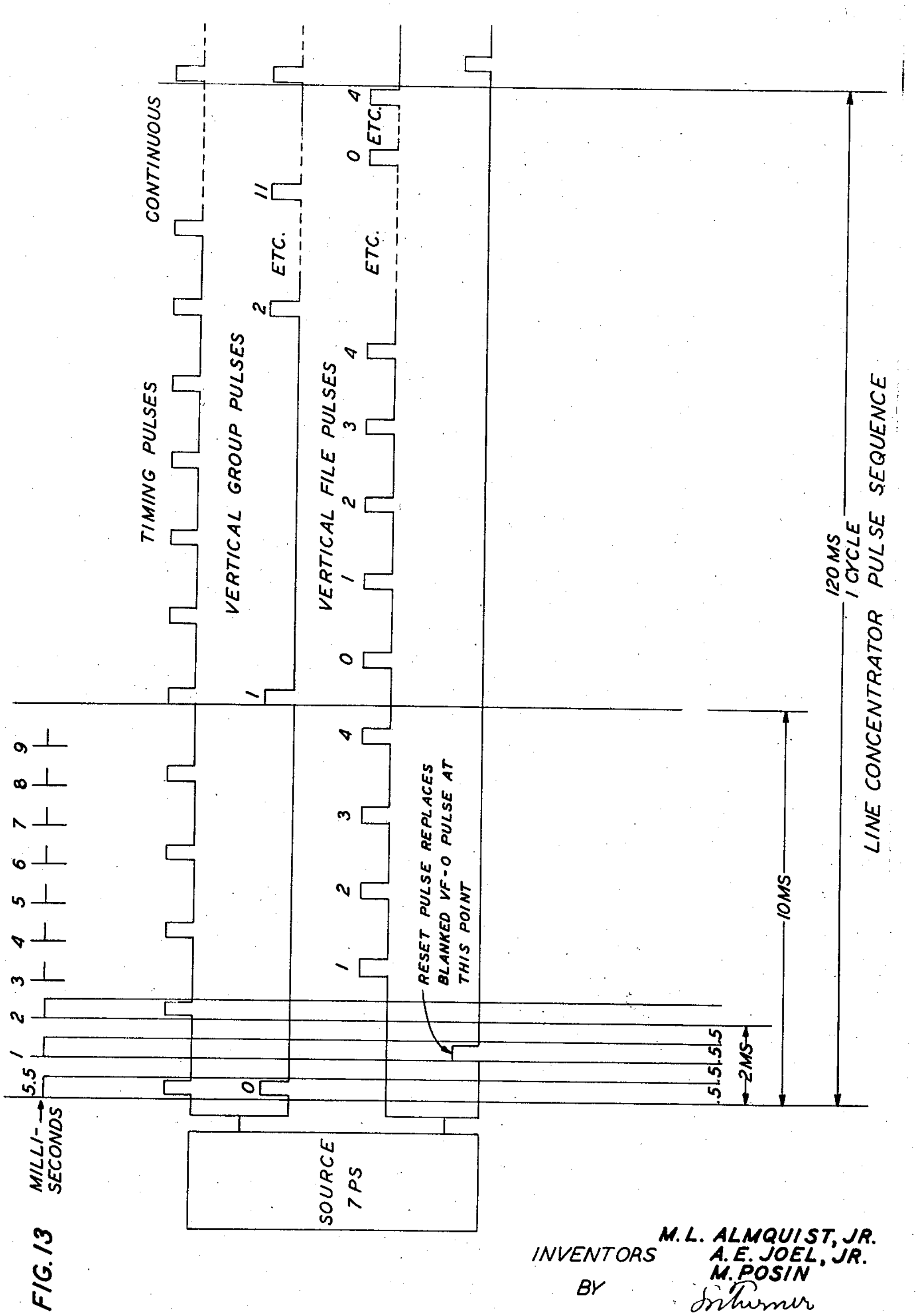
Fig. 13 is a series of pulse time curves illustrating the operation of the scanning system of the present invention.

The pulse source 7PS also supplies, as described above, a reset pulse instead of the first vertical file pulse to the line concentrator. The reset pulse is supplied from terminal 3 of the pulse source 7PS through the inhibiting gate 7RS2, the inhibiting gate 7RS1, the capacitor 7C1, the amplifier 7RL, which is also similar to amplifier 6VFL, and resistor 4R7 to the lower primary winding of transformer 4T2 which is connected to the battery 4B2. In this manner the vertical file pulses are supplied from the central office over the control pair 4CP1 and the vertical group pulses and the reset pulses are supplied through the control pair 4CP2. Fig. 13 illustrates the time sequence of the various pulses.

At the line concentrator the control pairs 4CP0–2 are connected respectively to the secondaries of the transformers 4T4–6. The upper primary of the transformer 4T5, which is shunted by the resistor 4R10, is connected to the input terminals of the vertical file receiving type amplifier 1VF; the upper primary winding of the transformer 4T6, which is shunted by the resistor 4R11, is connected to the input terminals of the vertical group amplifier 1VG; and the lower primary winding of the transformer 4T6 is connected to the input terminals of the reset amplifier 1RS. The amplifiers 1RS, 1VF and 1VG are all receiving type amplifiers and amplify the respective signals supplied thereto from the central office.

The amplifier 1VF, which is shown in detail, is substantially similar to the amplifier 6VFL described above. The vertical file pulses through the control leads 4CP1, however, are connected through the two input terminals 1 and 3, to the circuit components therein. The terminals 1 and 3 are connected across the capacitor 1C4 and to the emitter electrode of transistor 1T2, respectively, through the resistor 1R6 and the varistor 1V1. The input to the amplifier 6VFL is a single terminal input whereas the input to the amplifier 1VF is, in this manner, a double terminal input. With an input to the amplifier 1VF, terminal 1 becomes positive with respect to terminal 3 causing the trigger circuit including the transistors 1T1 and 1T2 to trigger. The capacitor 1C4 functions as a filter to prevent triggering amplifier 1MK when transistors 1T1 and 1T2 become conductive. When the transistors 1T1 and 1T2 in amplifier 1VF become conductive the emitter potential of transistor 1T2 decreases. Without the filter capacitor 1C4, a negative pulse would be supplied to the lower primary of transformer 4T5 to initiate a positive pulse in the upper primary thereof. Capacitor 1C4 is provided therefor to prevent such interaction and the false operation of amplifier 1MK resulting therefrom. The emitter electrodes of transistors 1T1 and 1T2 are connected by a feedback capacitor 1C5 which makes the amplifier very sensitive. The amplifier 1VF provides a pulse of shorter duration than that provided from the amplifier 6VFL due to the utilization of a small base capacitor 1C3. The emitter electrode of transistor 1T1 is connected to the output terminal 2 through the varistor 1V2 which is connected to the battery 1B2 through the resistor 1R7. The resistor 1R7 and the varistor 1V2 function as an isolating circuit component between the amplifier 1VF and the ring counter 3VF. The varistor 1V2 is necessary to avoid false triggering through capacitor 1C5 due to noise or other disturbances. The other circuit components in amplifier 1VF are similar to the corresponding ones in amplifier 6VFL.

The amplifier vertical file pulses are supplied from the output terminal 2 of amplifier 1VF to the five-stage vertical file ring counter 3VF which is similar to the counter 10VFR described above. The vertical group pulses received by the vertical group amplifier 1VG are supplied from the output terminal 2 thereof to the vertical group ring counter 5VG which is similar to the vertical group counter 11VGR described above. The counters 3VF and 5VG are stepped by the vertical group and vertical file pulses in synchronism with the counters 10VFR and 11VGR.

The reset pulse amplified through the amplifier 1RS is supplied from the output terminal 2 thereof through the capacitor 1RSC of the network 1G, and the varistors 5D7 and 3D7, respectively, to the reset terminals 4 of the stages 3VF1–4 and 5VG1–11. The reset pulse is also supplied from capacitor 1RSC through the varistors 5D1 and 3D1, respectively, to the terminals 6 of stages 3VF0 and 5VG0. In this manner as long as there are no service requests from any of the subscriber lines 2L00–59 or a terminating call thereto, the two circuits 1000 and 500 or the two sets of counters, one in the central office and one in the line concentrator, synchronously step through the count of 60 with a reset pulse being supplied at the beginning of each cycle to insure the synchronism of the two sets of counters.

Capacitor 1RS is also connected to the reset terminal 3 of the flip-flop circuit 1M which is similar to the hereinafter described circuit 8HGT. The resistor 1RS1 provides a recharge path to ground for the capacitor 1RSC.

At each combination of operated counter stages 5VG0–11 and 3VF0–4 a pulse is directed to scan one of the 60 lines 2L00–59 by the line scanning units 2LS00–59. Each of the line scanning units 2LS00–59 has two gating circuit components, one controlled by the counters 3VF and 5VG and the other controlled by the condition of the associated line. The first gating circuit component which includes the varistor 2D functions as an enabling or readying component for the scanning unit. The 60 scanning units 2L00–59 are arranged in a twelve by five rectangular array. The ring counter 5VG functions to successively ready rows of the array, or groups of five horizontally arranged line scanner units at a time by changing the reverse bias across varistor 2D from −20 volts to −2 volts. When the stage 5VG0, for example, is set, a positive pulse is provided from the output terminal 2 thereof through resistor 2VG of the line scanner units 2LS00–4 to the respective varistors 2D. The five varistors 2D in the units 2LS00–4 become biased to allow pulses from the ring counter 3VF, through capacitors 2VF, to pass therethrough. The varistors 2D in the other 55 units 2LS05–59 are reversed-biased by the −20 volt potential at terminals 2 of stages 5VG1–11. The ring counter 3VF provides scanning pulses successively to twelve line scanning units at a time. When stage 3VF0, for example, is set, a positive pulse is provided from the terminal 2 thereof to the capacitors 2VF in the units 2LS00, 2LS05, 2LS10, 2LS15, 2LS20, 2LS25, 2LS30, 2LS35, 2LS40, 2LS45, 2LS50 and 2LS55. Of these, only the unit 2LS00, however, has been readied at this time by the ring counter 5VG. The positive pulse from terminal 2 of relay 3VF0, therefore, is connected through the capacitor 2VF of the unit 2LS00, varistor 2D and capacitor 2C to the varistor 2S. The varistor 2S is part of the second gating circuit component which is controlled by the line condition.

Each line has associated therewith a resistor 2GS which is connected from the tip of the line to the +5 volt source 2B1 and a resistor 2ES which is connected from the ring lead of the line to the −20 volt battery 2B2 through the varistor 2V1. If the subscriber line 2L04 is open the battery 2B2 functions to reverse-bias the varistor 2S so that the scanning pulse from the ring counter 3VF is not transmitted therethrough. When, however, the subscriber line 2L00 is in a calling condition with the line closed, a circuit is completed from battery 2B1 through resistor 2GS, substation 2S00, resistor 2ES and varistor 2V1 to battery 2B2. The potential at the junction between varistor 2S and capacitor 2C becomes sufficiently positive to allow the scanning pulse from the ring counter stage 3VF0 to pass through the varistor 2S to the service request amplifier 1SR. The scanning units 2LS00–59 in this manner allow the vertical file pulses to pass therethrough as a service request pulse when both gating circuit components are enabled. The first component which includes varistor 2D is enabled by the counter 5VG and the second component which includes varistor 2S is enabled when the associated line is closed. When, however, the line 2L04 is connected to one of the trunks 4T, and is therefore in a busy condition the varistor 2S, as is hereinafter described, is reverse-biased.

If all the lines 2L00–59 remain idle the scanning sequence continues under control of the three sets of pulses, the vertical group, the vertical file and the reset pulses from the central office. Each vertical group pulse readies five line scanning units and each vertical file pulse scans one of the five readied line scanning units. In this manner the five readied line scanning units are successively scanned by the five vertical file pulses which occur between two of the vertical group pulses. At the time position for the first vertical file pulse the vertical file pulse is actually omitted, as described above, and a reset pulse is transmitted from the central office to insure that the counters 5VG and 3VF are in the start position. The stage 3VR0, however, when reset is on, and supplies a pulse to the scanning unit 2LS00.

When a call is initiated at one of the substations 2S00–59 the vertical file pulse from the ring counter 3VF is transformed by the scanning units 2LS00–59 to a service request pulse and supplied through the amplifier 1SR and resistor 4R9 to the lower primary winding of transformer 4T4. The amplifier 1SR is similar to the amplifier 6VFL described above and has a varistor 1SRV connected to input terminal 1. The varistor 1SRV, which is shunted by the resistor 1SRR, functions to couple negative pulses to ground. The lower primary winding of transformer 4T4 is connected to the varistor 4V6 and the battery 4B3 and the transformer 4T4 is connected through the control pair 4CP0 to the transformer 4T3 in the central office. The lower primary winding of transformer 4T3 is connected through the resistor 4R3 to the amplifier 6SRL which is similar to the amplifier 1VF described above. The output of the amplifier 6SRL is connected through the inhibiting gates 6CH0 and 6SRS to the flip-flop circuit 8HGT.

The flip-flop circuit 8HGT is a bistable transistor trigger circuit having two transistors 8T1 and 8T2 connected in a hook arrangement. An electrical pulse applied to the input terminal 1 triggers the circuit from one state to the other and leaves it there until a reset pulse to its terminal 3 triggers it back again to its former state. The flip-flop circuit is normal or off when its output terminal 2 is at a potential of −20 volts and off-normal or on when it has received a positive pulse through its set terminal to change the potential at its output terminal 2 to −2 volts. A positive pulse through the reset terminal 3 restores the potential at its output terminal 2 to −20 volts. The time consumed in changing the output potential from one value to another is approximately 2/10 of 1 microsecond.

When the flip-flop circuit 8HGT is in its off condition a very small amount of current somewhat less than 10 microamperes is supplied from the +5 volt source through resistor 8R2, transistor 8T1 and resistor 8R1 to ground. The transistor 8T1 represents almost all of the impedance in this circuit path. With a 5-volt potential across transistor 8T1 the emitter thereof is back-biased so that the transistors 8T1 and 8T2 are in their low current quiescent condition. There is also a small current between the source 8B2 and a −20 volt source 8B1. This path is from source 8B2 through resistor 8R2, the base-to-collector path through transistor 8T1, the base-to-emitter path of transistor 8T2 in parallel with resistor 8R5 and with the collector-to-emitter path of transistor 8T2 then through resistor 8R4 to battery 8B1. With transistor 8T2 being in its off or low current quiescent condition most of the potential drop is thereacross so that terminal 2 is at a potential of −20 volts.

When a posiitve pulse is supplied to terminal 1 of sufficient magnitude to raise the potential of the emitter electrode of transistor 8T1 above that of its base electrode, the transistor 8T1 becomes conductive. The input terminal 1 is connected through the capacitor 8C1 to the emitter electrode of transistor 8T1 which is connected to ground through the resistor 8R1 and also through the varistor 8D3. When the transistors 8T1 and 8T2 are turned on, there is a low resistance path from ground through the varistor 8D3, the emitter-to-collector path through transistor 8T1, the base-to-emitter path of transistor 8T2 and resistor 8R4 to battery 8B1. The increase in current through the resistor 8R4 causes an 18-volt drop across it to change the potential at terminal 2 to −2 volts. The voltage drop across the collector-to-emitter path of transistor 8T2 is very small so that the collector electrode thereof is effectively at the −2 volt potential. With the emitter electrode of transistor 8T2 effectively at ground potential it is therefore 2 volts more positive than its base electrode. This condition holds the transistors on to provide for the bistable operation. The circuit 8HGT includes a varistor 8D2 which is connected from the emitter electrode of transistor 8T2 to ground. The varistor 8D2 prevents the output lead from going positive or above ground potential.

The circuit 8HGT remains in this stable condition until a positive pulse is received through the reset terminal 3. The reset terminal 3 is connected through the capacitor 8C2 and varistor 8D1 to the base electrode of transistor 8T1. The junction between capacitor 8C2 and varistor 8D1 is connected to ground through the resistor 8R3. The positive pulse to the base electrode of transistor 8T1 makes it more positive than the emitter electrode thereof turning off the flip-flop circuit 8HGT.

When the flip-flop circuit 8HGT operates it functions generally to stop the transmission of the vertical group pulses but not the vertical file pulses to the concentrator and to lock the counter circuit 1000, described above, to register the designation of the calling line. The vertical file pulses are uninterrupted so that the five lines in the vertical group which includes the line requesting service are scanned every 10 milliseconds. Each time the requesting line is scanned another service request pulse is returned over the control pair 4CP0 to the central office. The successive detection of these service request pulses, as is hereinafter described, verifies the continuance of the service request. If a successive service request pulse is not detected it indicates that the service request has been abandoned.

More specifically the change from −20 volts to −2 volts at the output terminal 2 of the flip-flop circuit 8HGT performs the following functions:

(1) It opens the enabling gate 6VF which connects the reset pulses from pulse source 7PS to the vertical file signaling path to the line concentrator so that a reset pulse will now be transmitted to the line concentrator as a vertical file pulse. The gate 6VF is a three-terminal device with an input terminal 2, an output terminal 1 and a control terminal 3. Normally with −20 volts at terminal 3 the gate 6VF functions to prevent the passage of pulses from terminal 2 to terminal 1. Terminal 3 is connected to the varistor 6V3 through resistor 6R6 and varistor 6V3 is connected to terminal 1 and to terminal 2 through capacitor 6C4. With —20 volts at terminal 3, varistor 6V3 which is also connected to ground through resistor 6R7 is reverse-biased. When circuit 8HGT changes the potential at terminal 3 of gate 6VF, varistor 6V3 is reverse-biased by only 2 volts so that the reset pulse from source 7PS passes therethrough and through capacitor 6C1, amplifier 6VFL, transformer 4T1 and the control pair 4CP1 to the line concentrator;

(2) Circuit 8HGT also opens the enabling gate 6SRC, which is similar to gate 6VF, to direct subsequent service request pulses from the line concentrator through the amplifiers 6SRL and 9RLD1 and the delay circuit 9RLD2 to the flip-flop circuit 9RL in order to monitor for continued dial-tone request. The amplifier 6SRL, as described above, and the amplifier 9RLD1 are similar to the amplifier 6VFL, and the flip-flop circuit 9RL is similar to the circuit 8HGT described above. The delay circuit 9RLD2 is a monostable amplifier having transistors 9T1 and 9T2 connected in a hook arrangement. The output terminal 2 of amplifier 9RLD1 is connected through capacitor 9C3 to the input terminal 1 of circuit 9RLD2. Terminal 1 is connected directly to the base electrode of transistor 9T1 and through the varistors 9V5 and 9V6 to the emitter electrode of transistor 9T1. The varistor 9V5 is reverse-biased by the capacitor 9C3 which is charged by the —20 volt battery in amplifier 9RLD1 and varistor 9V6 is forward-biased by battery 9B7 which is connected thereto through resistor 9R5. Varistor 9V6 is also connected through capacitor 9C2 to battery 9B6 and to terminal 1 through resistor 9R4. The positive pulse provided by the differentiating capacitor 9C3 does not trigger circuit 9RLD2 as the emitter and base potentials are the same when varistor 9V5 is forward-biased. The trailing edge of the positive pulse from amplifier 9RLD1, however, provides a negative pulse to the base of transistor 9T1 causing circuit 9RLD2 to trigger. The delay provided for the second service request pulse is essentially the length of the pulse provided by amplifier 9RLD1 since the trailing edge thereof is utilized to trigger the circuit 9RLD2. Additional, though minor, delays are provided through the control leads 4CP0–2 but the additional delay provided by circuit 9RLD2 is necessary to insure the complete operation of the flip-flop circuit 9RL. If the second service request pulse arrives during the triggering interval of circuit 9RL it is ineffective to reset the circuit resulting in an abandonment of servicing the call. The emitter electrode of transistor 9T2 is connected to battery 9B7 through resistor 9R6 and to the output terminal 2. The second service request pulse will be provided, in this manner, from the output terminal 2 of circuit 9RLD2 to the reset terminal of the flip-flop circuit 9RL.

(3) Circuit 8HGT also closes the inhibiting gate 7VGS2 which blocks the vertical group pulsing from source 7PS to the line concentrator;

(4) Circuit 8HGT also closes the inhibiting gate 9RRG to block the pulse source 7PS from resetting the ring counter 1000;

(5) Circuit 8HGT also closes the inhibiting gate 7RS2 to block the transmission of the common reset pulses to the line concentrator as reset pulses;

(6) Circuit 8HGT also causes the operation of the horizontal group relay 8HG which is also connected to battery 8B3; and (7) Circuit 8HGT also sets the flip-flop circuit 9RH, and closes the gate 9RH1. The inhibiting gate 9RH1 provides a connection from the timing pulse terminal 7 of source 7PS to the reset terminal of flip-flop circuit 9RH. Circuit 9RH is in this manner maintained in its normal condition. When the gate 9RH1 is closed the timing pulses are not supplied to reset circuit 9RH.

When the flip-flop circuit 9RH is set it performs a number of functions:

(1) It closes the inhibiting gates 9VGR and 9VFR to disconnect counter circuit 1000 from source 7PS and lock the counter circuit 1000 to register the identity of the calling line; and (2) It closes the inhibiting gate 6SRS which opens the input lead to the flip-flop circuit 8HGT which, however, remains set until a reset pulse is applied thereto. The inhibiting gate 6SRS remains closed until the central office is normal and ready to accept other service requests.

To briefly recapitulate, the effect of a service request pulse from the line concentrator is to operate the flip-flop circuit 8HGT which stops the register counter 1000 and the transmission of vertical group pulses to the line concentrator. It also stops the transmission of reset pulses to the line concentrator as reset pulses, but sends them, if line 2L00 is one of the five lines being cyclically scanned, as vertical file pulses to the line concentrator. This is necessary since the source 7PS does not provide a vertical file pulse for line 2L00 and the reset pulse functions to provide a scanning pulse therefor at the concentrator. The source 7PS will provide a reset pulse only if the vertical group 0 is being scanned.

When relay 8HG operates, it places, by closing contact 10(8HG), the —20 volt battery 10B on one side of the windings of five relays 10VFT0–4 which are connected respectively through the varistors 10V0–4 to the output terminals 2 of the stages 10VFR0–4 in the counter 10VFR. When relay 8HG operates, it also connects, at its contact 11(8HG), the battery 11B to the twelve windings of the relays 11VGT0–11 which are connected respectively through the varistors 11V0–11 to the output terminals 2 of the stages 11VGR0–11. With the counters 10VFR and 11VGR stopped on the line location of the calling subscriber a —2 volt potential is on the other side of one of the relays 10VFT0–4 and one of the relays 11VGT0–11 causing them to operate. The operation of one of the relays 10VFT0–4 and one of the relays 11VGT0–11 calls in central office switching circuit 800 which includes markers and connectors of the type described in the Patent 2,585,904 which issued to A. J. Busch on February 19, 1952 and also is briefly described in the above-identified application to A. E. Joel, Jr. et al. For example, if the call is initiated from line 2L04, relays 10VFT4 and 11VGT0 are operated to close contacts 8(10VFT4) and 8(11VGT0) and provide indicating paths from battery 8B5 to circuit 800.

When one of the relays 10VFT0–4 operates it also closes a path from source 7PS to the input terminal 1 of the flip-flop circuit 9RL. With one of the relays 10VFT0–4 operated, the corresponding vertical file pulse from source 7PS passes through its contact 9 (10VFT0–4) and the varistor 9V4 to set the flip-flop circuit 9RL. The terminals of varistor 9V4 are connected to ground through the resistors 9R7 and 9R8. If the line 2L04, for example, is the call initiating line, relay 10VFT4 is operated and the next vertical file pulse 4, 10 milliseconds later, passes through the operated contact 9(10VFT4) to operate or set the flip-flop circuit 9RL. If the circuit 9RL, which is similar to the circuit 8HGT, remains in this condition it resets, as is hereinafter described, the circuit 8HGT to return the central office to normal.

During the time that the central office circuit 800 is being called in, the pulse source 7PS continues to supply the reset, vertical group and vertical file pulses. As described above, however, the only pulses that are sent to the line concentrator are the vertical file pulses and when the vertical group 0 is being scanned the reset pulse over the vertical file path. Every time the vertical file pulse corresponding to the calling subscriber is sent, which is once every 10 milliseconds, a service request pulse comes back to the central office and through the open gate 6SCR, the amplifier 9RLD1 and delay circuit 9RLD2 to the reset terminal 3 of the flip-flop circuit 9RL. The circuit 9RL is set, as described above, by the vertical file pulse corresponding to the calling line and is reset by the service request pulse which is delayed by the circuit 9RLD2. If the subscriber abandons the call and the second service request pulse is not received the circuit 9RL opens the enabling gate 9RL1 to allow the next timing pulse from the source 7PS to pass therethrough, and through the open inhibiting gate 8RL and the amplifier 8HGTA to reset the flip-flop circuit 8HGT. The amplifier 8HGTA may be similar to amplifier 6VFL.

When the flip-flop circuit 8HGT resets, it causes the release of the relay 8HG which in turn releases the operated ones of the relays 10VFT0–4 and 11VGT0–11 and the demand to the central office control circuit 800 is removed. When circuit 8HGT is reset it also restores the various gates to their normal scanning condition. The next reset pulse from the source 7PS causes the counter circuit 1000 in the central office and the counter circuit 500 in the line concentrator to return to normal and another line scan starting with line 2L00 is started.

With the assurance however that there is a constant dial-tone request, the demand to the circuit 800 is sustained and the call proceeds in a normal manner. The successive detection of the service request pulses verifies the continuance of the request since the second service request pulse resets the circuit 9RL to disable the gate 9RL1 so that the next timing pulse from source 7PS does not pass therethrough to reset the circuit 8HGT.

With a sustained demand to circuit 800, by the connection of battery 8B5 thereto through an operated one of the contacts 8(10VFT0–4) and through an operated one of the contacts 8(11VGT0–11), the circuit 800 functions to apply −2 volts to lead 8L5 to condition the central office control circuits for the transmission of "set" signals to the line concentrator. The −2 volts on lead 8L5 function to disable the gates 8RL, 6CH0, 6VFS, 7VGS1 and 7RS1 and to enable the gates 6LBT, 6VFT, 7VGT and 7RST. Lead 8L5 is connected to terminal 3 of gate 6CH0 through varistor 6V4 and resistor 6R9. The junction between varistor 6V4 and resistor 6R9 is connected to the −20 volt battery 6B3 through the resistor 6R8. The battery 6B3 biases the gates 8RL, 6CH0, 6VFS, 7VGS1, 7RS1, 6CBT, 6VFT, 7VGT and 7RST connected thereto. After readying these gates the circuit 800 controls the pulse source 7PS through lead 8L4 to supply a reset pulse and the correct number of vertical file and vertical group pulses to set the counter circuit 500 at the line concentrator to the identity of the calling line.

After the pulse source 7PS supplies the reset, vertical file and vertical group pulses it supplies a series of mark pulses to the concentrator to effect the connection of the calling line to one of the trunks 4T. The mark pulses are supplied through gate 7M, amplifier 7ML, which is similar to amplifier 6VFL, transformer 4T1 and the control pair 4CP1 to the concentrator. The lower primary of transformer 4T5 is connected to the amplifier 1MK which is similar to the amplifier 1VF. The output terminal 2 of amplifier 1MK is connected to the flip-flop circuit 1M which is similar to the circuit 8HGT described above. Circuit 1M operates relay 3M which is connected to battery 3B1. When relay 3M operates, it connects battery 3B1 through its operated contact 3(3M) to the windings of relays 3F0–4 and 5G0–11. The relays 3F0–4 are connected respectively through varistors 3V0–4 to the output terminals 2 of stages 3VF0–4 in counter 3VF and the relays 5G0–11 are connected respectively through varistors 5V0–11 to the output terminals 2 of stages 5VG0–11 in counter 5VG. Since as described above the pulse source 7PS supplies a number of vertical group and vertical file pulses which indicate the identity of the calling line to the concentrator, the counters 3VF and 5VG are set in accordance therewith. If, for example, the stage 3VF4 and the stage 5VG0 are set, the relays 3F4 and 5G0 operate when contact 3(3M) closes.

Figure 4:
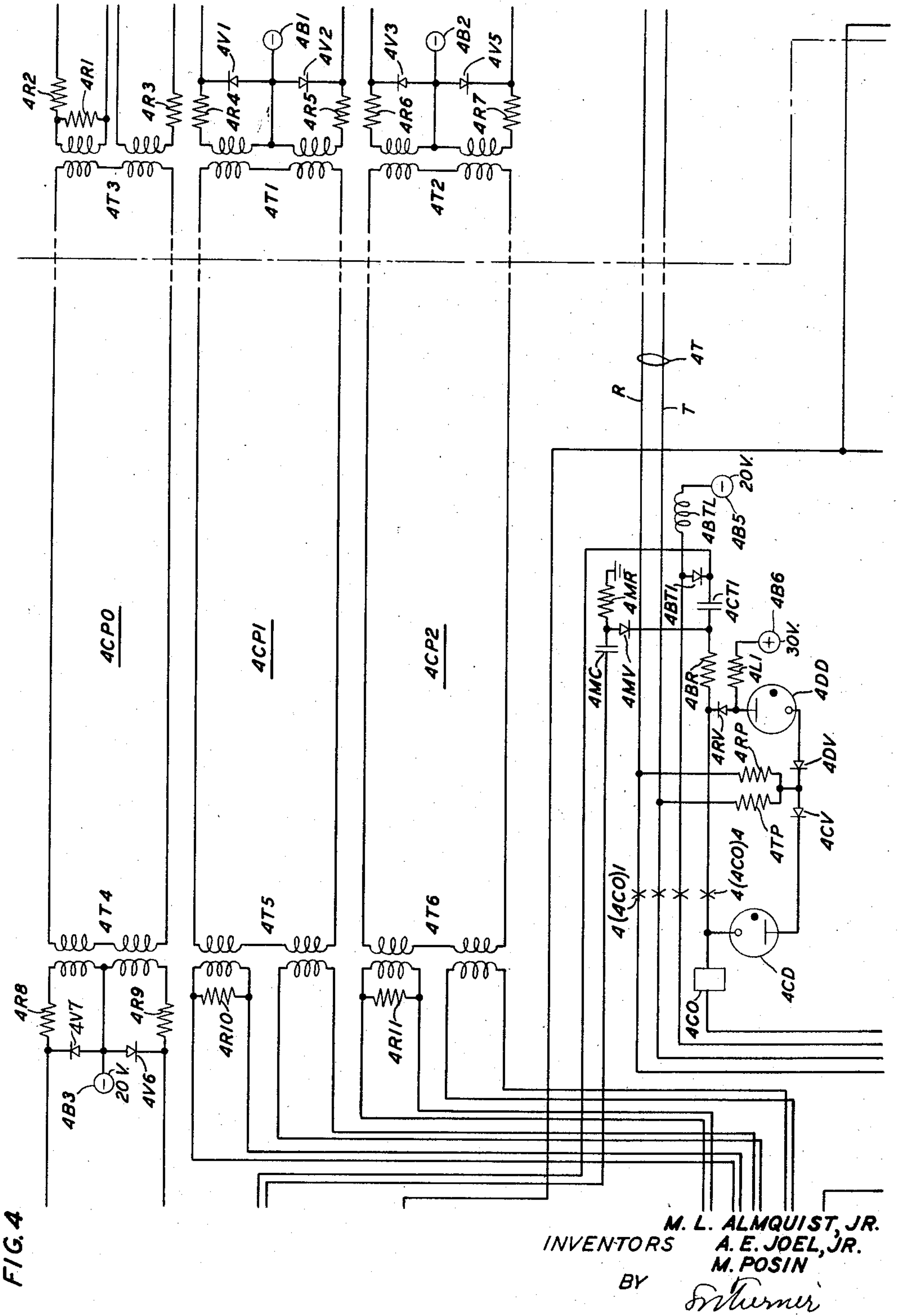
Fig. 4 illustrates the connections between the line concentrator and the central office.

With one of the relays 3F0–4 operated and one of the relays 5G0–11 operated the −65 volt source 5B is connected to the winding of one of a plurality of relays 4C0. The relay 4C0 shown in Fig. 4 is associated with the line 2S04 and has the battery 5B connected thereto when the contacts 5(3F0) and 5(5G0)4 are operated. There is at least one relay 4C0 for each of the subscriber lines 2S00–59 for providing a connection therefrom to one of the trunks 4T. In other words each one of the lines 2S00–59 is connected to at least one of the trunks 4T. As described in the above-identified application A. E. Joel, Jr. et al., the contacts of the relays 4C0 are multipled to the trunks 4T because there are fewer trunks 4T than lines 2S00–59.

Coincident with the line marking operation described above the circuit 800 in the central office functions to connect a +100 volt potential to the tip lead of the trunk 4T. The tip lead of the trunk 4T is connected through the resistor 4TP and the varistor 4CV to the gas tube 4CD which is connected to the other side of the relay 4C0. The combination of the +100 volts at the anode of the tube 4CD and the −65 volts applied through the winding of the relay 4C0 to the cathode of tube 4CD causes the diode 4CD to ionize and establish a conductive path through the relay 4C0.

When the relay 4C0 operates it closes the four contacts 4(4C0)1–4. The contacts 4(4C0)1–2 establish a connection between the line 2L04 and the trunk 4T to the central office. The third contact 4(4C0)3 makes a connection from point S in the line scanner 2LS04 through the inductor 4BTL to the −20 volt battery 4B5. The connection of the battery 4B5 to point S in the line scanner 2LS04 changes the potential at point S to −20 volts so that the line 2L04 will not indicate a service request when line scanning is resumed. The −20 volts at point S reverse-biases the varistor 2S so that service request pulses are not provided to the amplifier 1SR. When scanning is resumed, as is hereinafter described, a scanning pulse applied to the line scanner unit 2LS04 passes from point S through the closed contact 4(4C0)3, varistor 4BT1 and amplifier 1LB, which is similar to amplifier 6VFL, through transformer 4T4 and the control pair 4CP0 to the central office. The control pair 4CP0 is connected through transformer 4T3, the amplifier 6LBL which is similar to the amplifier 1VF described above, the enabling gate 6LBT, and lead 8L1 to the circuit 800. In this manner when line scanning is resumed the scanning pulses to lines which are busy, that is, connected to a trunk 4T, are converted by the associated ones of the line scanning units 2LS00–59 to line busy pulses and supplied to the central office. The line scanning units 2LS00–59 therefore function not only to determine the calling condition of a line but also to supply a line busy indication thereof to the central office.

When relay 4C0 operates it also functions to change the bias of a diode 4MV from +30 volts to allow the rest of the mark pulses from the central office to pass therethrough. The diode 4MV was reversed-biased by the battery 4B6 which is connected thereto through the resistor 4L1, varistor 4RV and resistor 4BR. The other terminal of varistor 4MV is connected to ground through the resistor 4MR and to the output terminal 2 of the flip-flop circuit 1M through the capacitor 4MC. When relay 4C0 operates it extends the connection from the −65 volt battery 5B through the operated contact 4(4C0)4, the varistor 4RV and resistor 4L1 to the battery 4B6 locking relay 4C0 operated. The current through resistor 4L1 causes the potential at varistor 4MV to decrease and allow the mark pulses therethrough. With the varistor 4MV forward-biased the succeeding marking pulses from the central office through the amplifier 1MK are supplied through the capacitor 4MC, varistor 4MV and capacitor 4CT1 to the input terminal 1 of the line busy amplifier 1LB. Terminal 1 is connected to the source 1B4 through the parallel circuit consisting of the resistor 1LB1 and the capacitor 1LB2. Terminal 2 of the amplifier 1LB is connected through resistor 4R8 to the upper primary of the transformer 4T4 and also through varistor 4V7 to the battery 4B3. The transformer 4T4 is connected through the control pair 4CP0 to the transformer 4T3 in the central office. In this manner the succeeding marking pulses are routed back to the central office through the amplifier 1LB as line busy pulses to indicate that the crosspoint relay 4C0 has operated.

The line busy pulses are coupled through the upper primary of transformer 4T3, which is shunted by resistor 4R1, through resistor 4R2, the amplifier 6LBL, the enabled gate 6LBT and lead 8L1 to the circuit 800. When such a series of line busy pulses is received at the circuit 800 it removes the readying potential from lead 8L5 and initiates the operation of the source 7PS to supply a reset pulse to the line concentrator and to circuit 1000. Both circuits 500 and 1000 are reset and the normal scanning cycle is resumed.

The output terminal of the amplifier 1RS which receives the reset pulse in the concentrator is connected as described above through the network 1G to the circuit 1M. The output terminal 2 of amplifier 1RS is connected through the capacitor 1RSC to the reset terminal 3 of the flip-flop circuit 1M, causing it to reset. When circuit 1M resets it releases relay 3M which in turn releases relays 3F4 and 5G0. Relay 4C0, however, remains operated due to the locking path through its contact 4(4C0)4. The locking path is from battery 4B6, through resistor 4L1, varistor 4RV, contact 4(4C0)4, the winding of relay 4C0, and resistor 2CT to ground.

At the same time that circuit 800 initiates the operation of the pulse source 7PS to recommence the normal scanning sequence, it removes the +100 volt connect potential from the tip lead of trunk 4T. With the connect potential removed, tube 4CD extinguishes but relay 4C0 remains operated, as described above.

The normal scanning cycle continues until another service request is made by one of the lines 2L00–59 or a call is made thereto. When the subscriber at substation 2S04 hangs up, the circuit 800 detects the opening of line 2L04 and applies a −130 volt disconnect potential to the tip lead of trunk 4T. The disconnect potential is provided through resistor 4TP and varistor 4DV to the cathode of tube 4DD. The anode of tube 4DD is connected through resistor 4L1 to battery 4B6 so that tube 4DD ionizes. When tube 4DD ionizes its anode potential decreases to reverse-bias the varistor 4RV to thereby open the locking path for relay 4C0. When relay 4C0 releases it disconnects line 2L04 from trunk 4T. During the disconnect sequence the normal scanning cycle is continued.

It is to be understood that the above-described arrangements are illustrative of the application of the principles of this invention. Numerous other arrangements may be devised by those skilled in the art without departing from the spirit and scope of the invention, as for example more or less subscriber lines may be scanned with the number in a vertical group or vertical file being larger or smaller.

What is claimed is:

1. A scanning unit for providing indications of the service condition of a telephone subscriber line comprising a first and a second gating circuit component, said first gating circuit component having a varistor and two control leads connected to said varistor, one for receiving enabling pulses for said varistor and one for receiving scanning pulses, said second gating circuit component comprising a voltage divider connected across said line, a varistor connected to and controlled by the potential on one wire of said line and connected to said first gating circuit component for controlling the path of said scanning pulses passing through said varistor in said first component.

2. A scanning unit in accordance with claim 1 comprising in addition means connected to the junction between said first and said second components for reverse biasing said varistor in said second component and for receiving said scanning pulse as a line busy indication pulse when said line is busy.

3. A scanner circuit for each subscriber line in a line concentrator telephone system comprising a first varistor, a second varistor connected to said first varistor, means for reverse biasing said first varistor when the associated subscriber line is idle and when the associated line is busy, and for forward biasing said first varistor when said associated line is in a calling condition, an input for receiving readying pulses connected to said second varistor, and an input for receiving scanning pulses connected to said second varistor.

4. A line concentrator telephone scanning system comprsing a plurality of subscriber lines, a scanning unit for each of said lines, means for supplying a series of pulses for successively readying groups of said scanning units, means for successively supplying scanning pulses to different groups of said scanning units wherein each includes one of said readied scanning units, each of said scanning units including means responsive upon the application of a scanning pulse thereto for providing respectively a service request and a line busy indication in accordance with the calling condition and busy condition of the associated one of said lines, and means responsive upon the reception of said service request indication for disabling said ready pulse supply means.

5. A line scanning system for remote line concentrators comprising a plurality of subscriber lines, a plurality of scanning units associated individually with said subscriber lines forming a rectangular array and providing indications of the service conditions of said lines, each of said scanning units having a first gate circuit controlled by the service condition of the associated one of said lines, and a normally closed second gate circuit connected to said first gate circuit, means for supplying a series of pulses for successively opening said second gate circuits in rows of said units in said array, and means for successively supplying scanning pulses to said second gate circuits in columns of said units in said array.

6. A line scanning system for remote line concentrators comprising a plurality of subscriber lines, a plurality of scanning units associated individually with said subscriber lines forming a rectangular array and providing indications of the service conditions of said lines, each of said scanning units having a first gate circuit controlled by the service condition of the associated one of said lines to provide service request indications and line busy indications, a normally closed second gate circuit connected to said first gate circuit, means for supplying a series of pulses for successively opening said second gate circuits in rows of said units in said array, means for successively supplying scanning pulses to said second gate circuits in columns of said units in said array, and means responsive upon the reception of a service request indication from said first gate circuit in any one of said units for disabling said means supplying pulses for opening said second gate circuits.

7. A line scanner comprising a plurality of lines having an idle, a busy and a calling condition; an individual scanner unit connected to each of said lines having a diode and a capacitor; a first and a second counter; means for connecting said diode of each of said units to said first counter; means for connecting said capacitor of each of said units to said second counter; means including said units controlled by said first and said second counters for providing an indication of the condition of said lines; and means operable responsive to the calling condition of any one of said lines for stopping the operation of said first counter and for continuing the operation of said second counter.

8. A scanning circuit for signaling the service condition of a subscriber line in a telephone system comprising a first impedance connected to one wire of said line, a second impedance connected to the other wire of said line, a source of potential connected from said first impedance to said second impedance, a first gating circuit component connected to one wire of said line and controlled by the potential condition thereof to provide a service request indication, a second gating circuit component connected to said first gating circuit component, and a counter controlling said second gating circuit component.

9. In a line concentrator telephone system employing a line concentrator for providing a connection from a plurality of remotely located subscriber lines to a smaller plurality of trunks connected to the central office, a line scanning system comprising a plurality of scanning units associated individually with said subscriber lines forming a rectangular array and providing indications of the service conditions to said lines, each of said scanning units having a first gate circuit controlled by the service condition of the associated one of said lines to provide service request indications and line busy indications, a normally closed second gate circuit connected to said first gate circuit, means for supplying a series of pulses for successively opening said second gate circuits in rows of said units in said array, means for successively supplying scanning pulses to said second gate circuits in columns of said units in said array, means responsive upon the reception of a service request indication from said first gate circuit in any one of said units for disabling said means supplying pulses for opening said second gate circuits, and means responsive upon the connection of one of said subscriber lines to one of said trunks for utilizing the line busy indication provided from said first gate circuit as an indication of the accomplished connection of line to trunk.

10. A line scanning system for remote line concentrators in a telephone system comprising a pulse source supply for providing vertical file, vertical group and reset pulses to the line concentrators, a plurality of subscriber line scanning units at said line concentrators arranged in vertical groups and vertical files wherein each vertical group consists of a plurality of said units which are each in a different vertical file, and each of said vertical files consists of a plurality of said units which are each in a different vertical group, counter means at said line concentrators controlled by said vertical file, vertical group and reset pulses for successively readying said vertical groups and then for successively providing scanning pulses to said vertical files, and means controlled by said scanning units for disabling the supply of said vertical group pulses to said line concentrators.

11. A line scanning system for remote line concentrators in a telephone system comprising a pulse source supply for providing vertical file, vertical group and reset pulses to the line concentrators, a plurality of subscriber line scanning units at said line concentrators arranged in vertical groups and vertical files wherein each vertical group consists of a plurality of said units which are each in a different vertical file, and each of said vertical files consists of a plurality of said units each in a different vertical group, counter means at said line concentrators controlled by said vertical file, vertical group and reset pulses for successively readying said vertical groups and then for successively providing scanning pulses to said vertical files, and means controlled by said scanning units for locking said counter means to maintain readied ones of said vertical groups while cyclically providing said scanning pulses.

12. A line concentrator telephone scanning system comprising a plurality of subscriber lines, a scanning unit for each of said lines, means for supplying a series of pulses for successively readying groups of said scanning units, means for successively supplying scanning pulses to different groups of said scanning units wherein each includes one of said readied scanning units, each of said scanning units including means responsive upon the application of a scanning pulse thereto for providing respectively a service request and a line busy indication in accordance with the calling condition and busy condition of the associated one of said lines, and means responsive to the initiation of said service request condition for increasing the rate of supplying said scanning pulses to said service requesting line.

13. A line concentrator telephone scanning system in accordance with claim 12 comprising in addition switching means operative upon the reception of a predetermined plurality of service request indications from one of said scanning units for establishing a talking connection to said associated line.

14. A line scanning system comprising a plurality of lines having idle and calling conditions, means for cyclically scanning each of said lines to determine its condition, and means responsive to the initiation of a calling condition on any one of said lines for controlling said scanning means to scan said calling line more frequently than when all said lines are in said idle condition.

15. A line scanning system comprising a plurality of lines having at least two conditions, means for cyclically scanning said lines to periodically determine the condition of each of said lines, and means responsive to a change in condition on any one of said lines for controlling said scanning means to periodically determine the condition of said changed condition line at a different rate.

16. In a line concentrator telephone system employing a line concentrator for providing a connection from a plurality of remotely located subscriber lines to a smaller plurality of trunks connected to the central office, a line scanning system comprising a plurality of scanning units associated individually with said subscriber lines forming a rectangular array and providing indications of the service conditions to said lines, each of said scanning units having a first gate circuit controlled by the service condition of the associated one of said lines to provide service request indications and line busy indications, a normally closed second gate circuit connected to said first gate circuit, means for supplying a series of pulses for successively opening said second gate circuits in rows of said units in said array, means for successively supplying scanning pulses to said second gate circuits in columns of said units in said array, means responsive upon the reception of a service request indication from said first gate circuit in any one of said units for disabling said means supplying pulses for opening said second gate circuits, a register circuit synchronously operated with said first and said second-mentioned pulse supply means and responsive upon the reception of a service request invention for registering the identity of the one of said lines associated with said scanning unit that initiated the service request indication.

17. In combination, a plurality of devices to be scanned, electrical scanning means comprising a plurality of first gating devices biased individually in accordance with the condition of said devices to be scanned, a plurality of normally nonconducting second gating devices connected individually in series with said plurality of first gating devices and having a first and a second input terminal, means for supplying conditioning pulses to said first input terminals of groups of said second gating devices, and means for successively supplying scanning pulses to said conditioned second gating devices.

18. A scanning matrix having *m* input terminals for receiving conditioning pulses, *n* input terminals for receiving scanning pulses, *n* times *m* scanning units, and *n* times *m* lines to be scanned associated individually with said scanning units, each of said scanning units including two serially connected varistors normally biased to be nonconducting, one of said varistors being connected to the associated one of said conditioning pulse input terminals and to the associated one of said scanning pulse input terminals, and the other of said varistors being connected to the associated one of said lines.

19. In combination, a plurality of lines to be scanned having a service request condition, an idle condition and a busy condition; a service request terminal; a line busy terminal; a plurality of scanning units associated individually with said lines, each of said units having a first varistor connected between said service request terminal and said line busy terminal and poled in the direction of positive current towards said service request terminal, a voltage divider connected to the associated one of said lines for biasing said first varistor to be nonconductive when said associated line is in an idle condition and to be conductive when said associated line is in its service request condition, and a normally nonconductive second varistor connected to and poled in the direction of positive current towards said first varistor and said line busy terminal; means for successively forward biasing said second varistors in pluralities of said units; means for successively supplying scanning pulses to said forward-biased second varistors; and means connectable to each of said lines for reverse biasing the associated first varistor when the line is busy.

20. A scanning system comprising a group of devices each having at least two conditions, means for cyclically determining the condition of each of said devices in said group of devices, and means responsive to the change in condition of any one of said devices for controlling said determining means to cyclically determine the condition of each of said devices in a subgroup of said devices including said changed condition device.

21. In combination, a plurality of lines having at least two conditions, means for scanning said lines to periodically determine the condition of each of said lines, means responsive to the change in condition of any one of said lines for controlling said scanning means to periodically determine the condition of said changed condition line at an increased rate, switching means controlled by said scanning means for establishing a communication channel to said changed condition line, and means controlled by said control means for inhibiting the operation of said switching means in the event the condition of said changed condition line changes again before the operation of said switching means is completed.

No references cited.